Nov. 14, 1961    R. C. ALLEN ET AL    3,008,192
METHOD AND APPARATUS FOR FORMING PLASTIC ARTICLES
Filed March 4, 1959    16 Sheets-Sheet 8
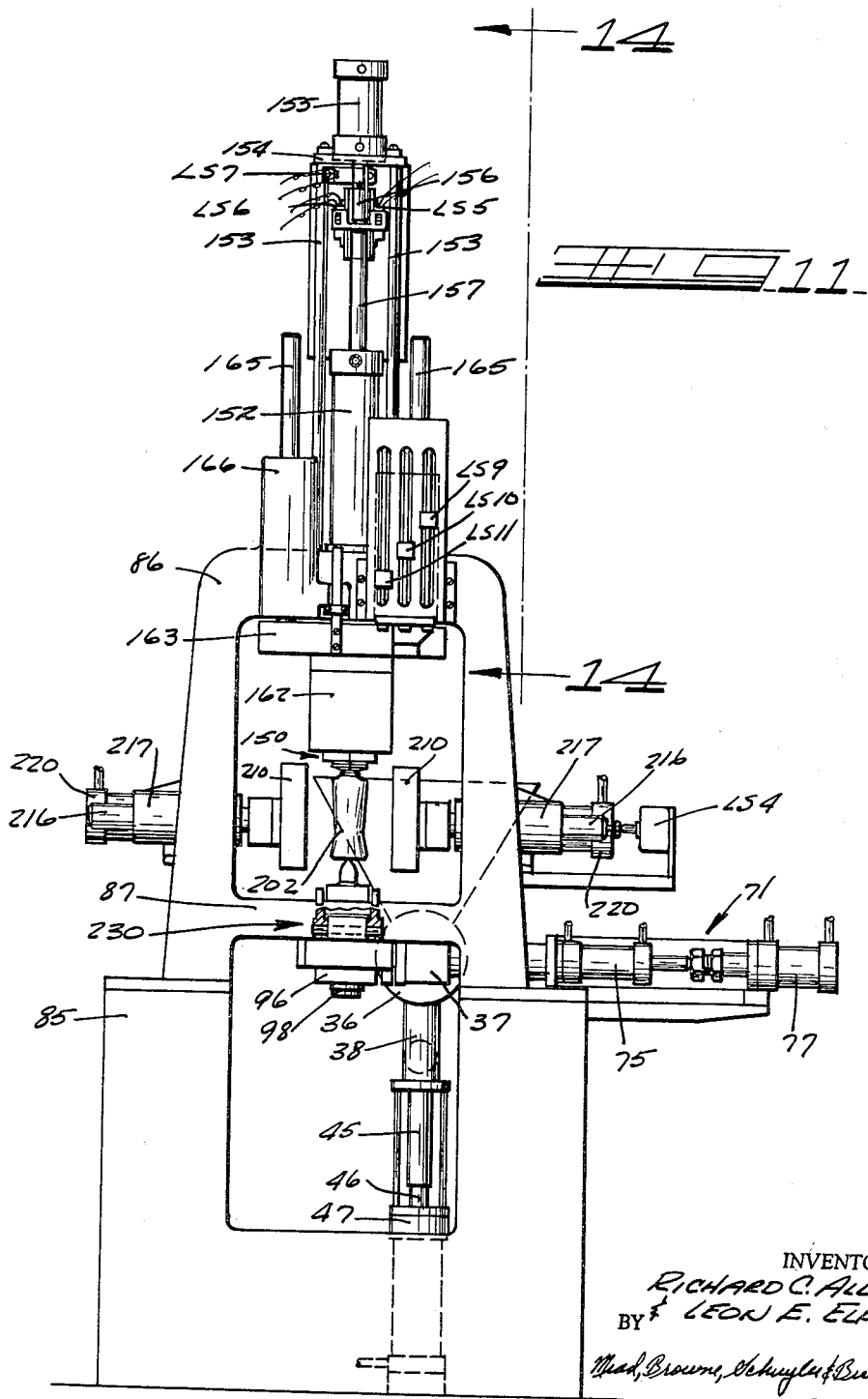
INVENTORS
RICHARD C. ALLEN
BY LEON E. ELPHEE
Mead, Browne, Schuyler & Beveridge
ATTORNEYS

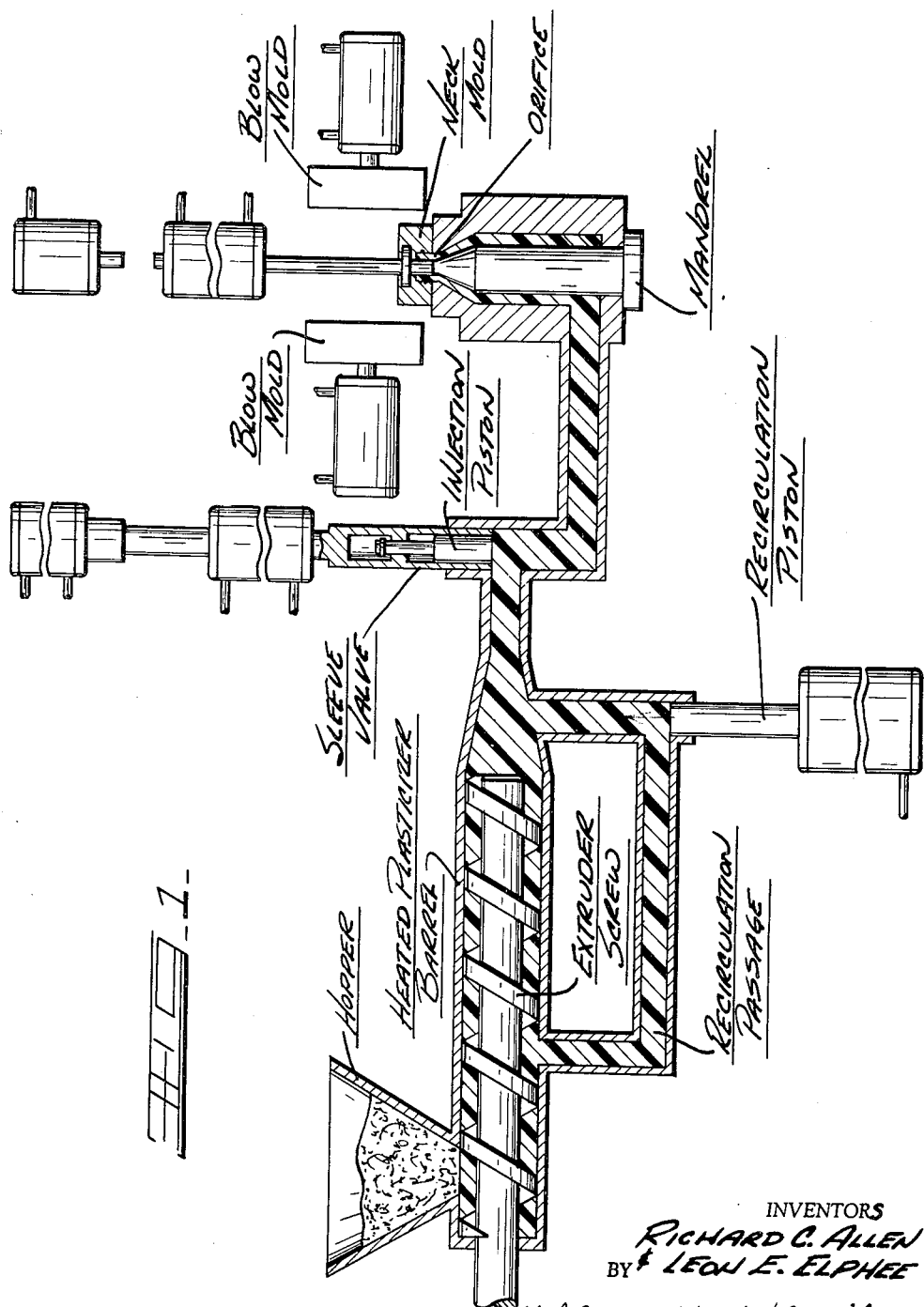

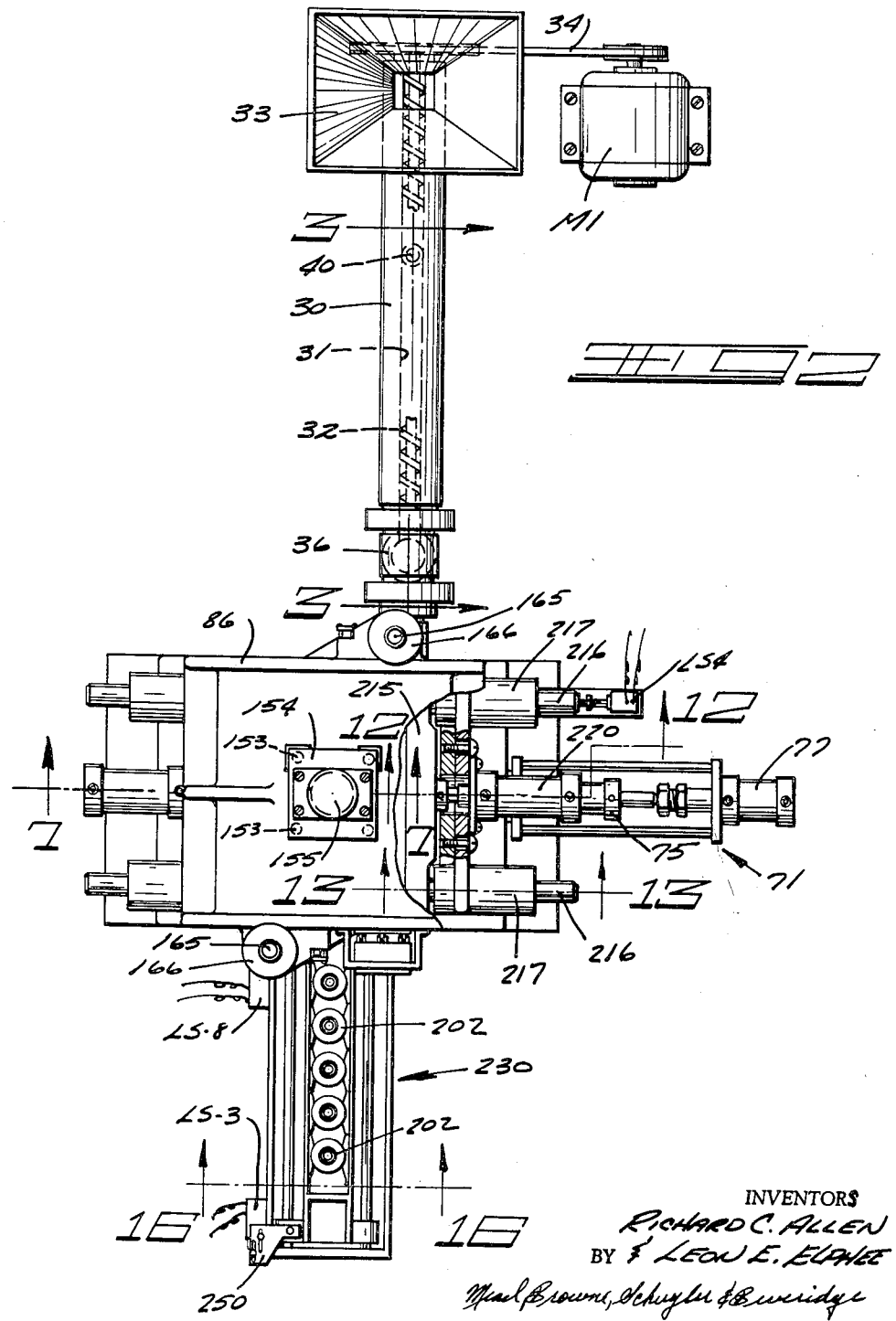

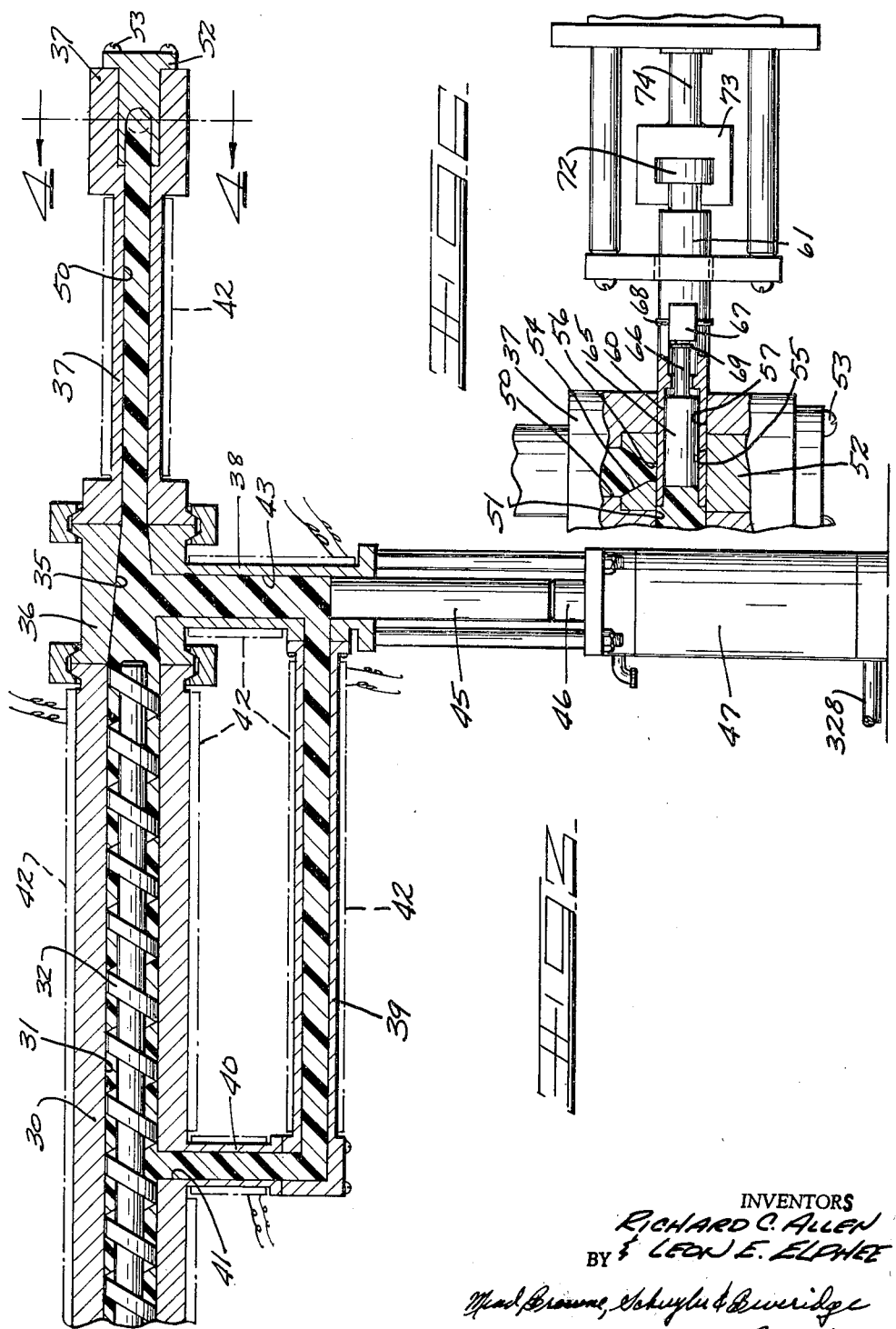

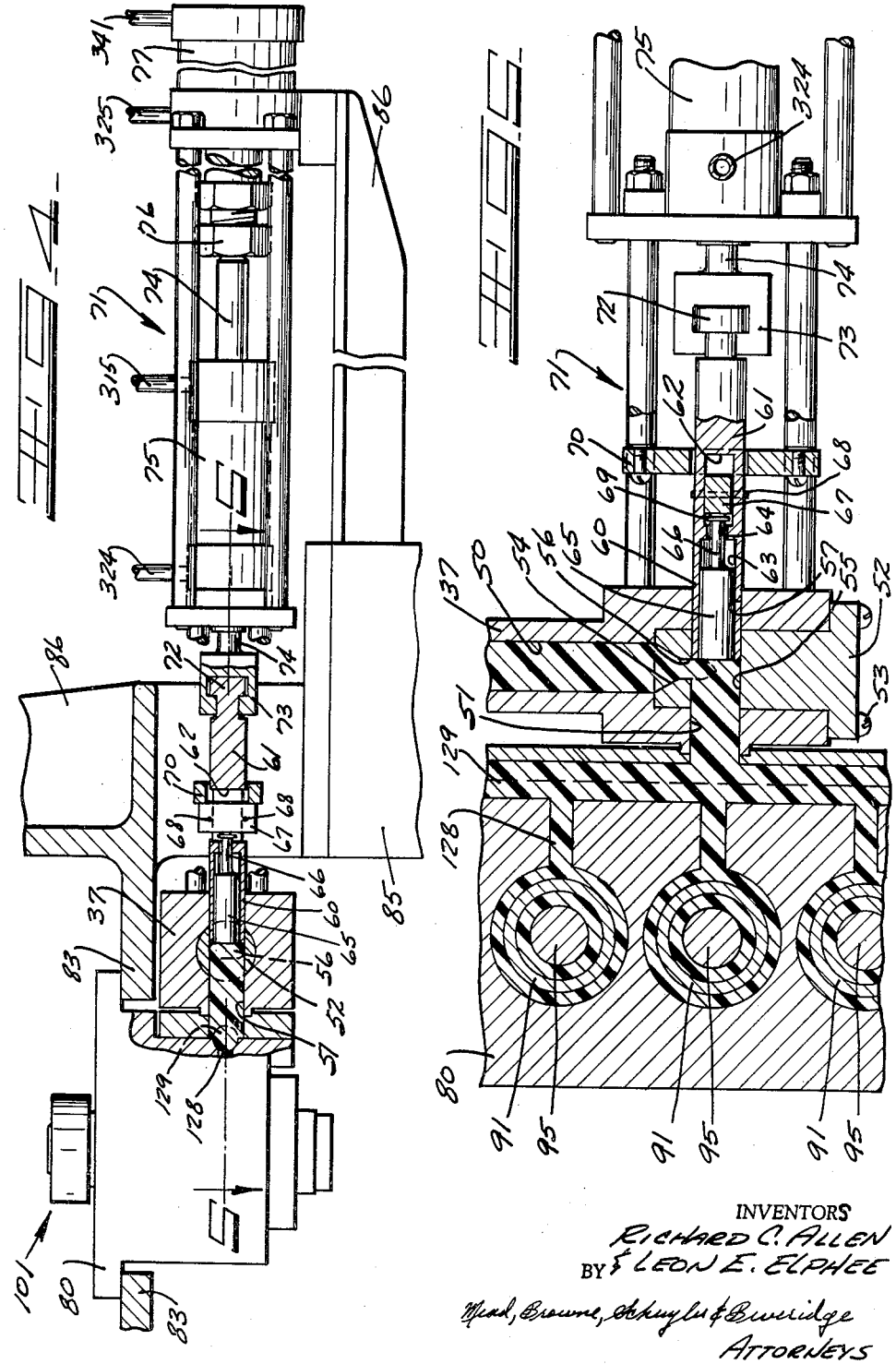

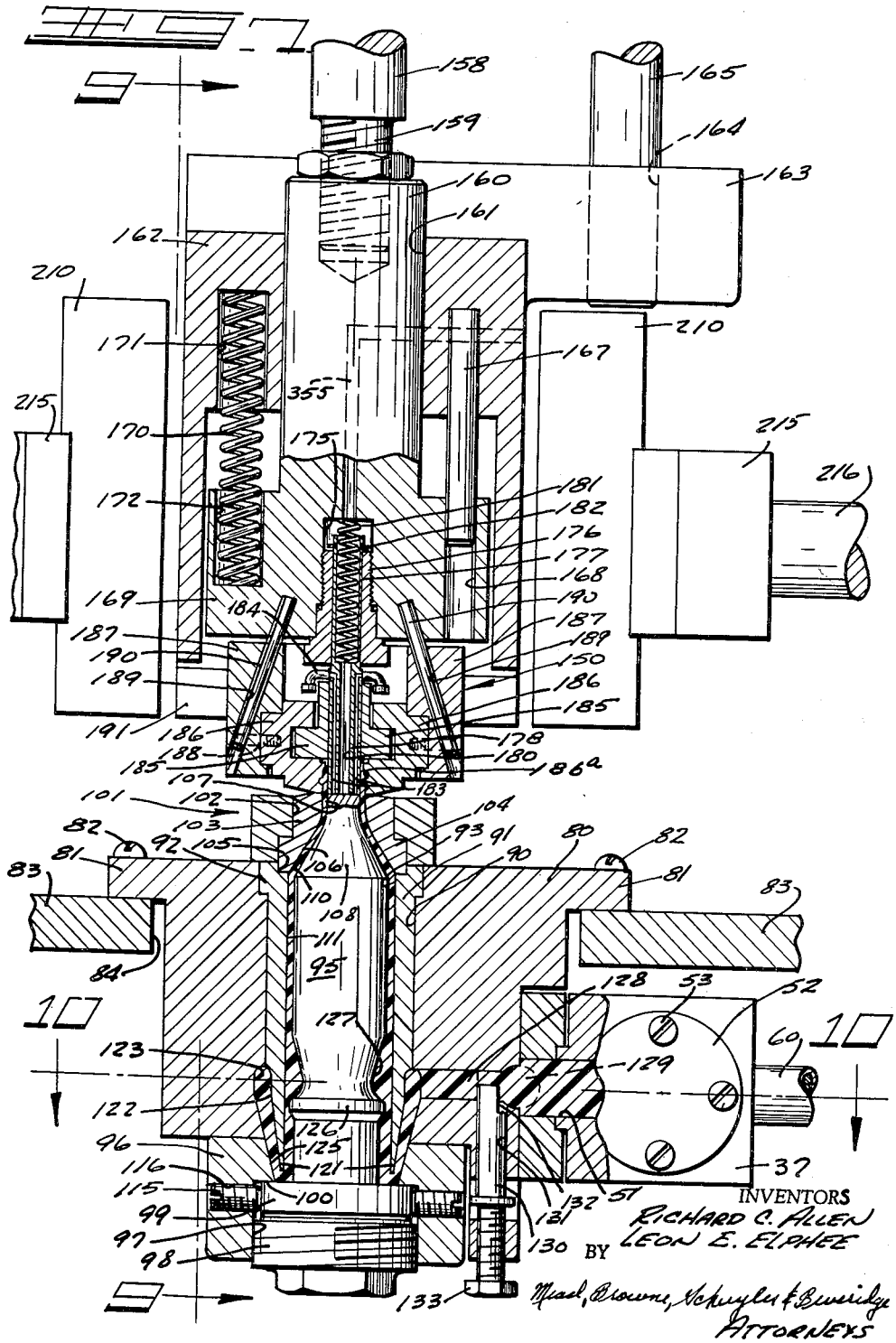

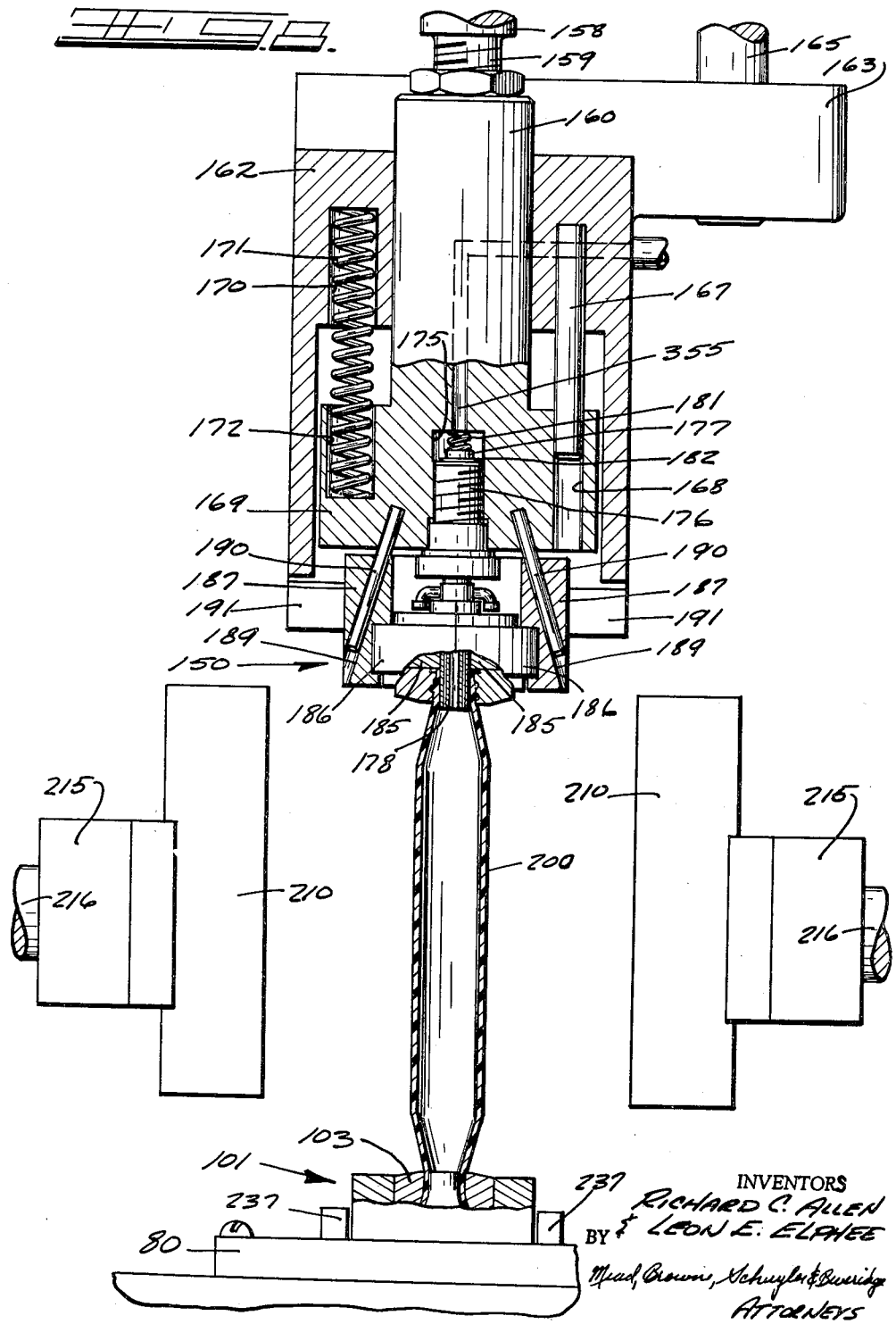

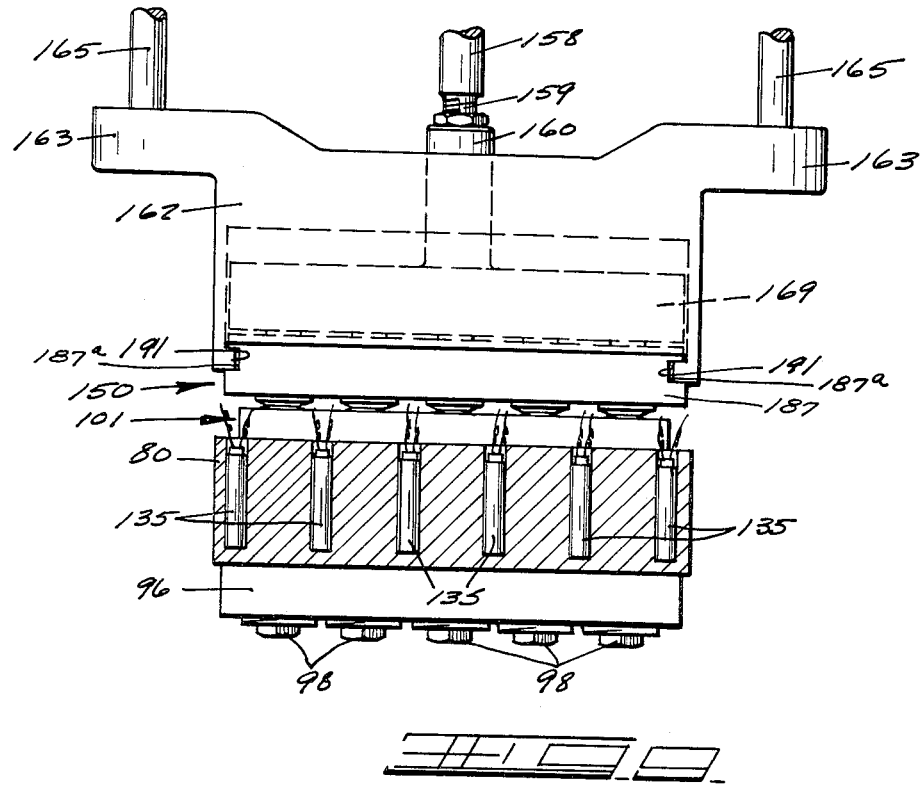
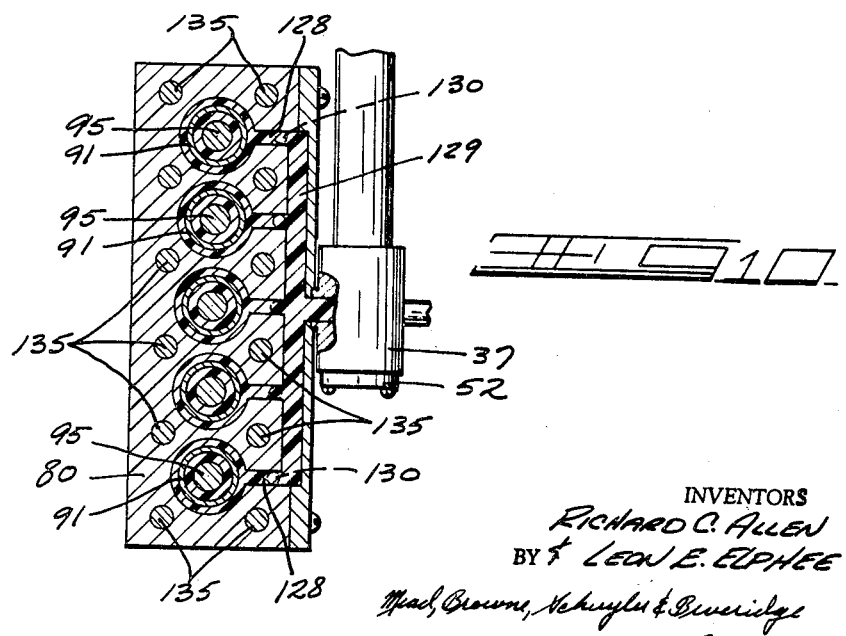

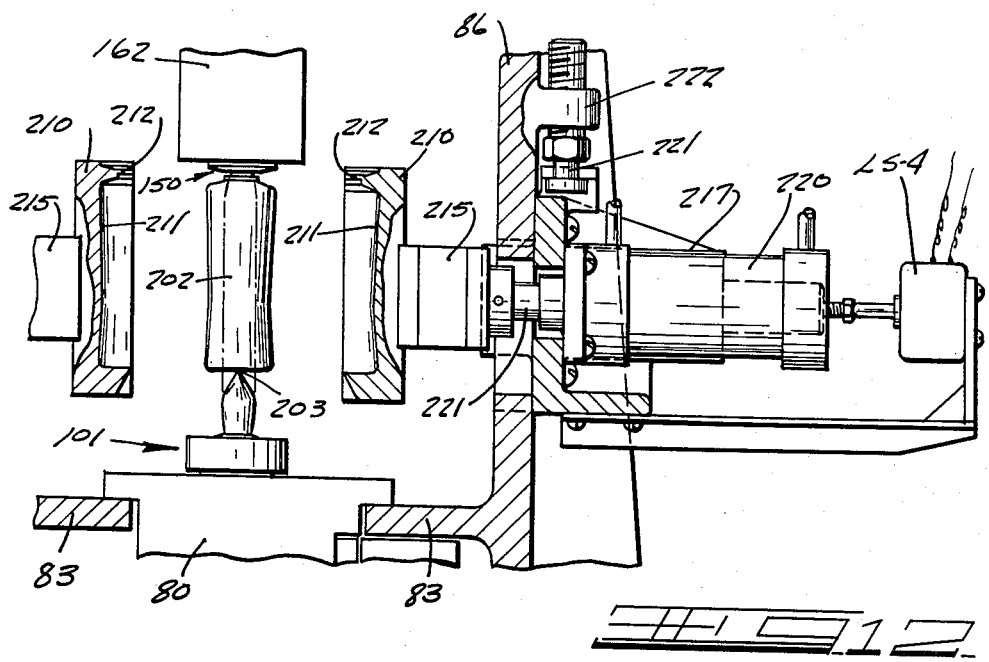
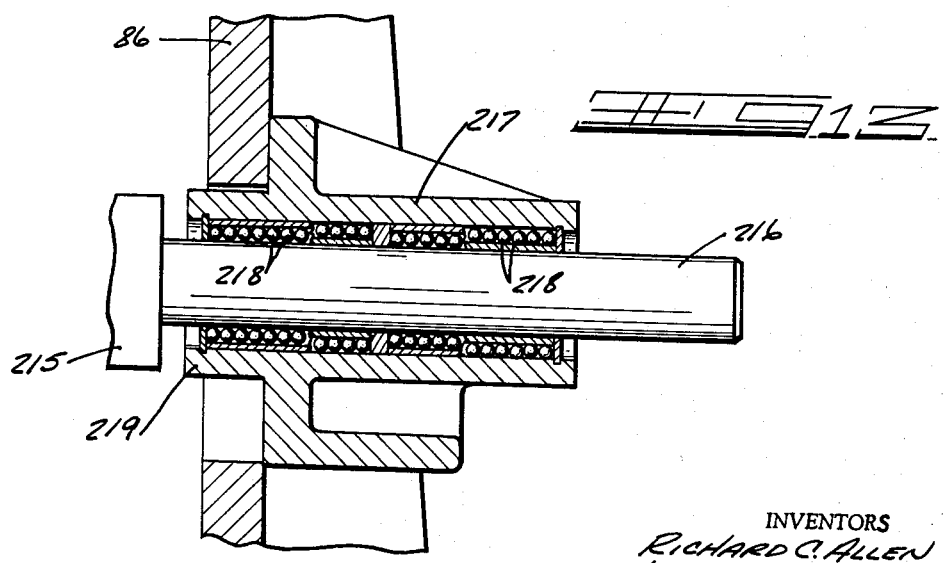

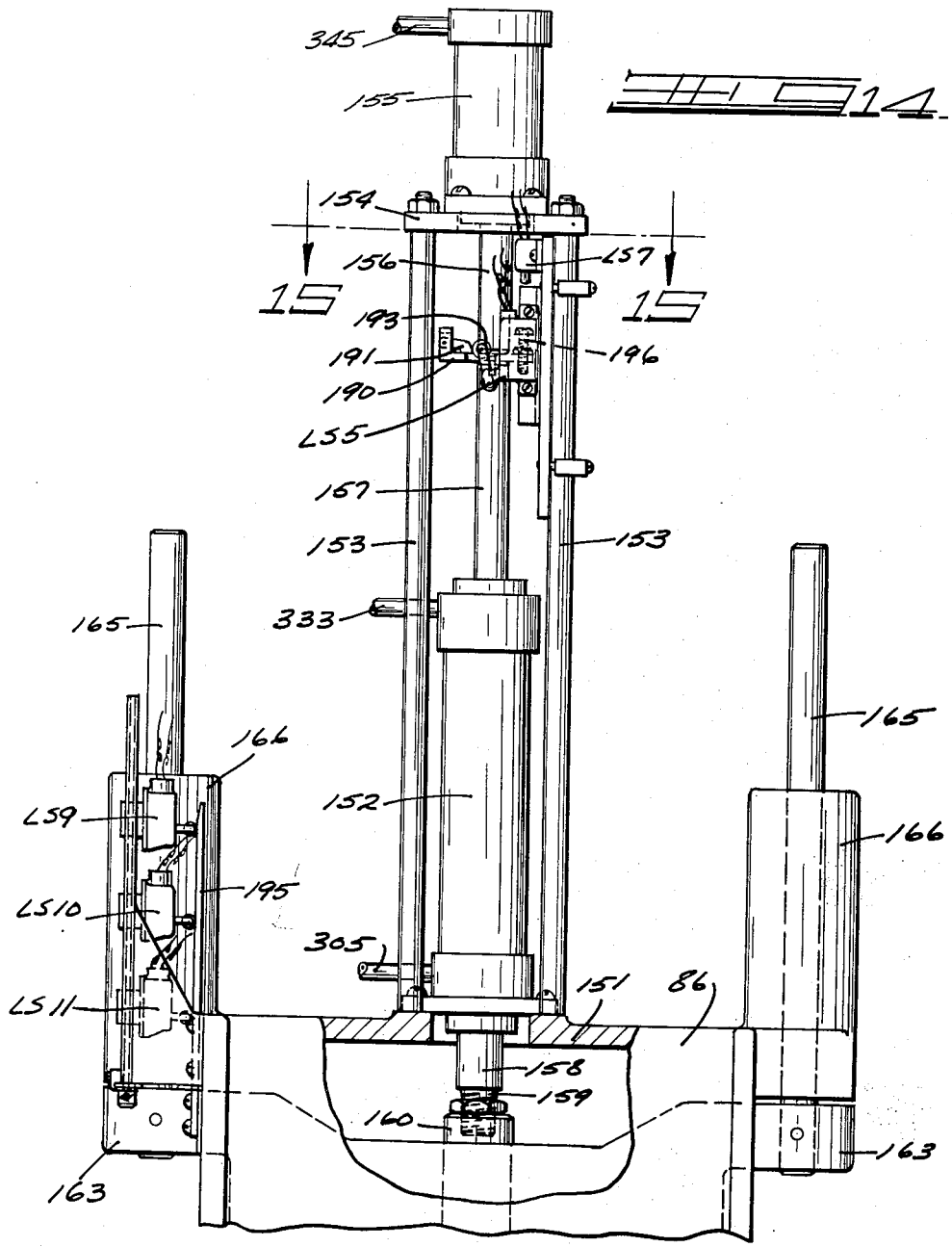

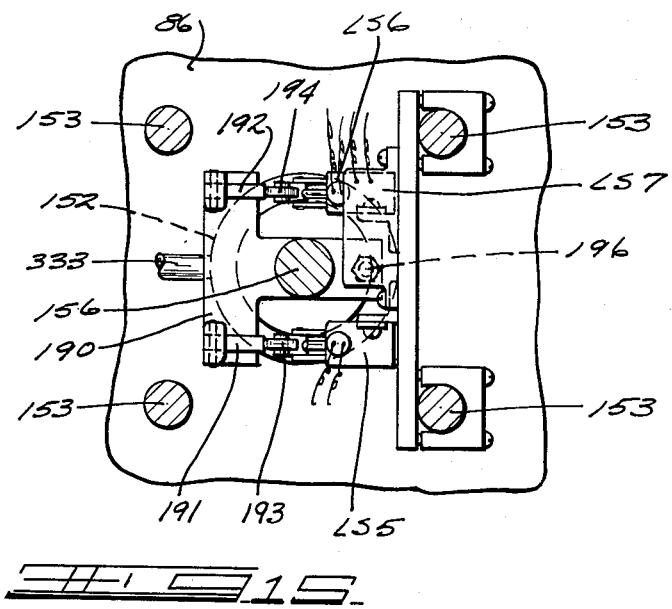
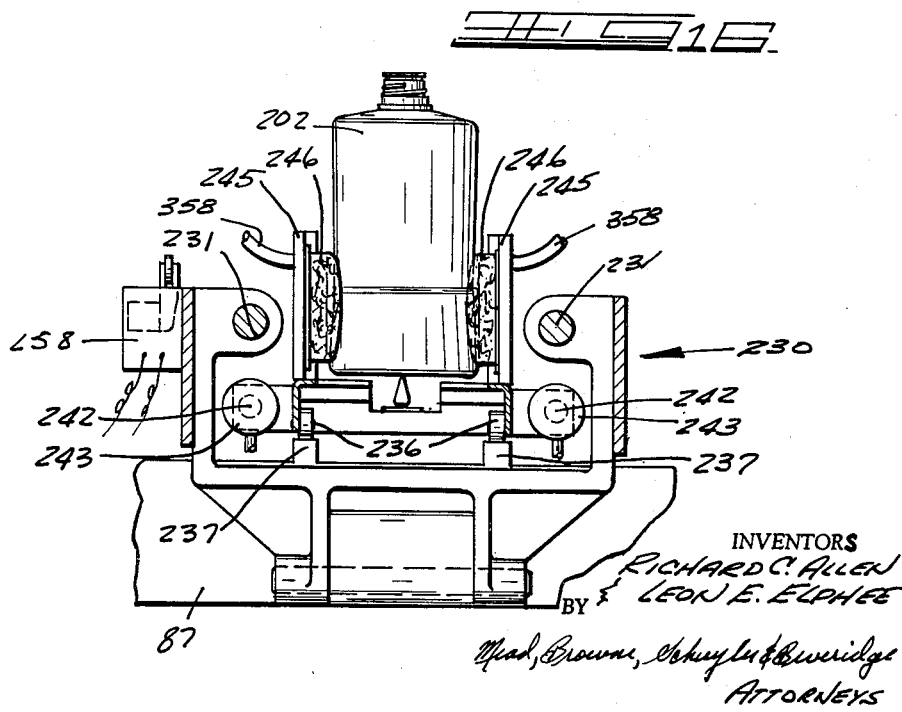

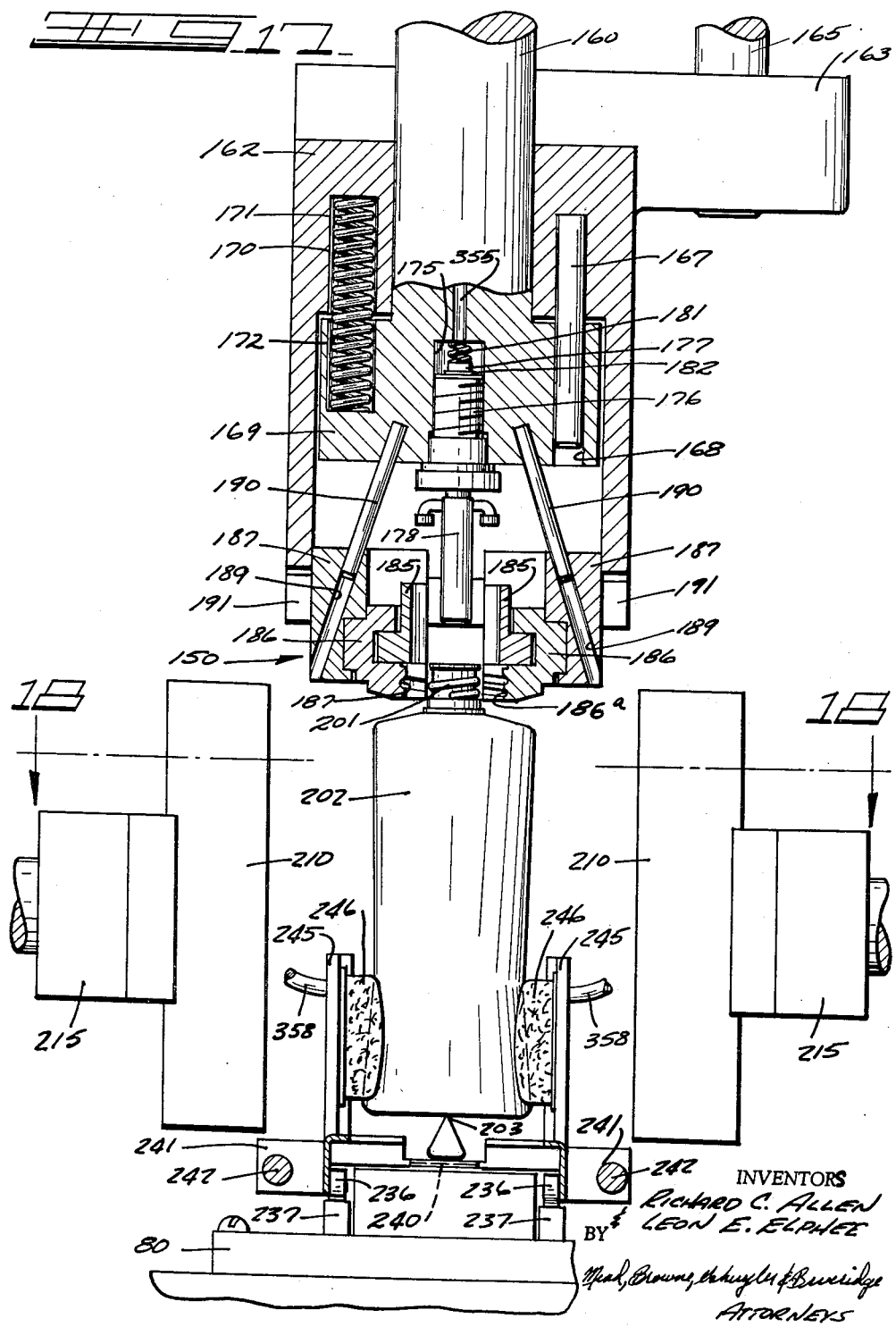

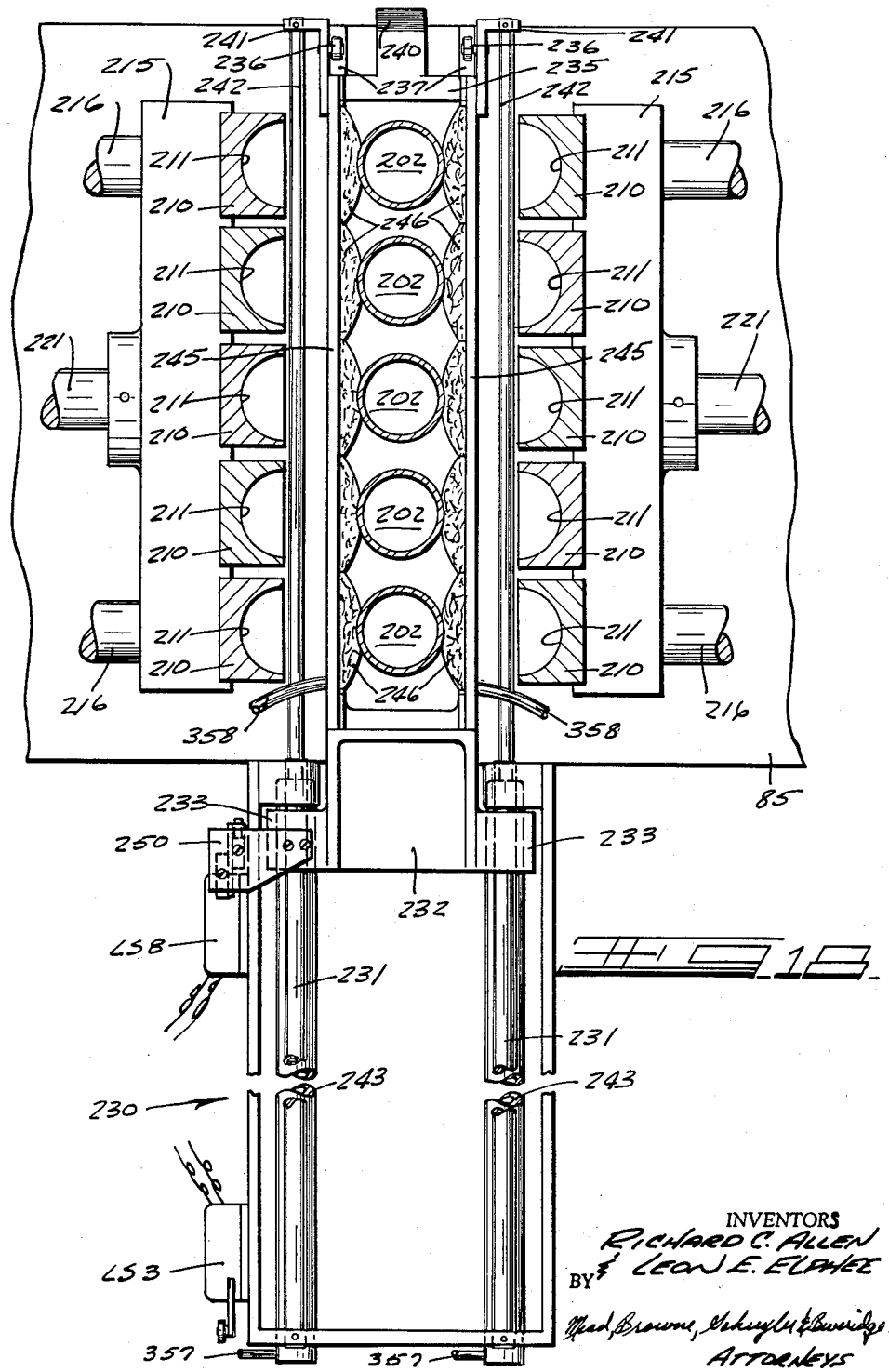

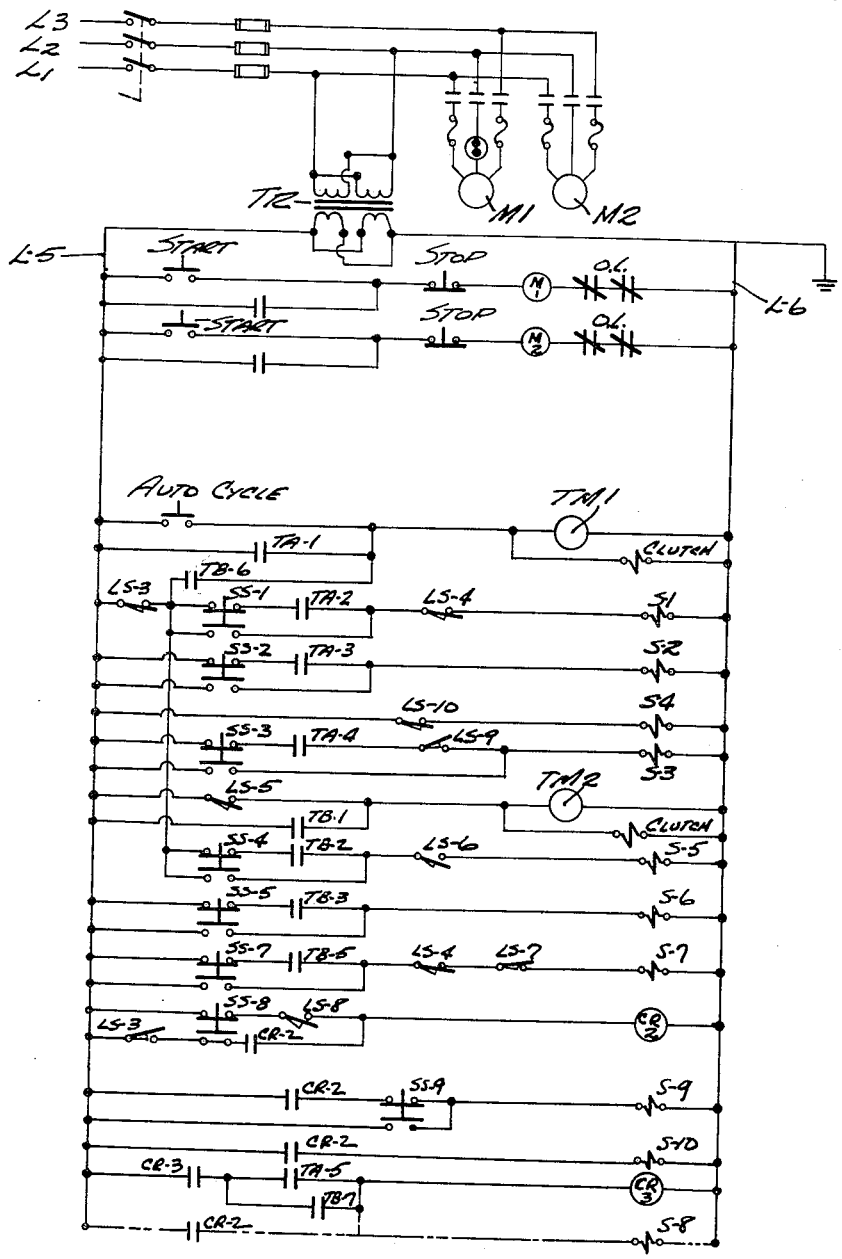

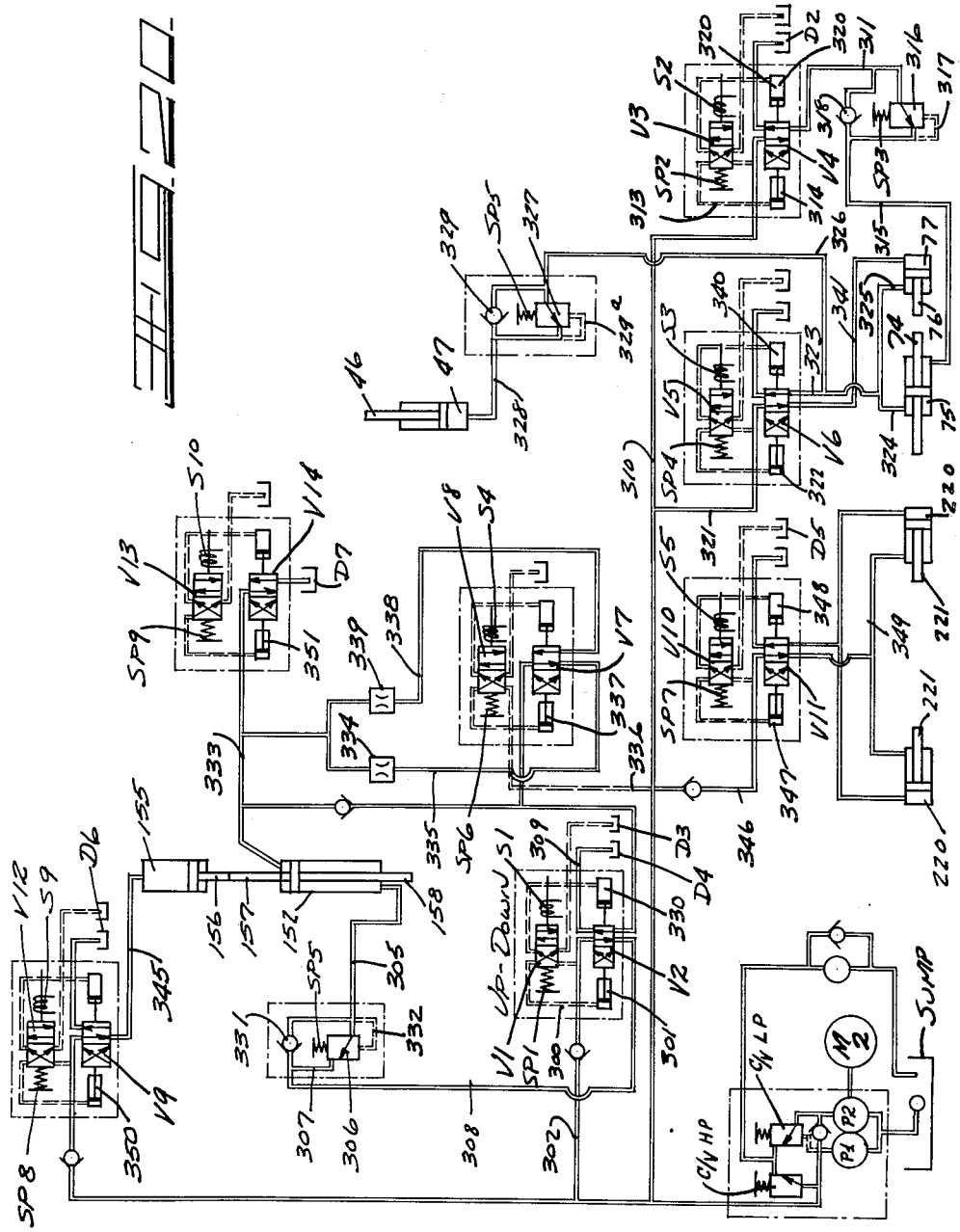

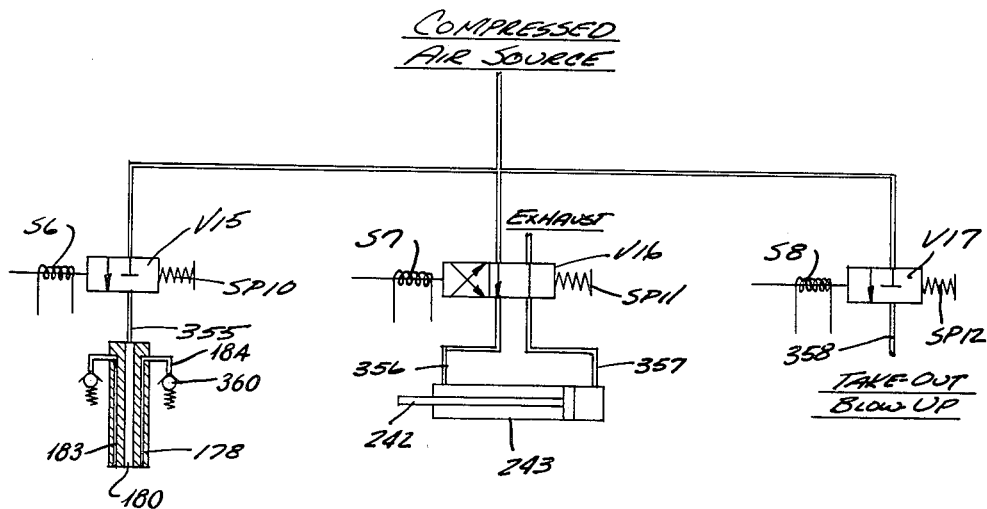

United States Patent Office 3,008,192
Patented Nov. 14, 1961

3,008,192
METHOD AND APPARATUS FOR FORMING PLASTIC ARTICLES
Richard C. Allen, Maumee, and Leon E. Elphee, Toledo, Ohio, assignors to Owens-Illinois Glass Company, a corporation of Ohio
Filed Mar. 4, 1959, Ser. No. 797,276
5 Claims. (Cl. 18—55)

The present invention relates to a plastic forming machine and method and more particularly to a machine and method for the manufacture of plastic articles by the combined injection molding, extrusion and blowing of plasticized material.

This invention provides a machine particularly adapted for the manufacture of plastic articles, such as containers or the like, having a main blown portion and a minor injection molded portion. In the case of containers, the injection molded portion forms the container finish or neck portion of the container body.

The present invention provides primarily a continuous process for the manufacture of such articles and a machine provided with electrical, hydraulic and pneumatic controls for automatically carrying out the process.

This invention thus is concerned with a process for the formation of a plastic article from plasticized material, such as polyethylene, supplied to an annular orifice through which material is injected into an injection mold superimposed over the orifice to form a finished portion of the article. Next, the injection mold is withdrawn from the orifice as the expression of material by extrusion occurs through the orifice to form a sleeve or tube of material integral with that filling the injection mold. After the sleeve is extruded, it is enclosed by a multipart blow mold, blow air is introduced through the previously formed portion in the injection mold, and the tube is blown into the finished article against the blow mold walls. After opening the blow mold and severing the blown article from the orifice, the article is removed.

One novel feature of the present invention resides in the utilization of a recirculating extruder and plasticizer wherein plastic material, preferably thermoplastic in nature, is reduced to a fluid plastic state by the application of heat and pressure, and the fluid material is issued under substantial pressures from the plasticizer outlet. During certain portions of the operation of the machine, particularly throughout the blowing and article removing steps, the material plasticized in the plasticizer, and which would normally issue therefrom, is not utilized. To avoid intermittent operation of the plasticizer, the plasticized material is recirculated within the plasticizer-extruder through a closed circulatory path, thus permitting positive prevention of communication between the plasticizer and the extrusion orifice. Further this recirculation is controlled by a power displaceable piston movable to supplement the output pressure of the plasticizer during the extrusion portion of the cycle and operative to cut off recirculation during those periods of the cycle during which the plasticizer output is being utilized. The internal pressure generated by continued plasticizer operation is utilized to return this piston from its power actuated position so that recirculation can be accommodated.

It is therefore an important object of the present invention to provide an improved plastic forming machine.

Another object of this invention is the provision of an improved plastic forming method for the manufacture of plastic articles by combined injection molding, extrusion and blowing techniques.

A further object of this invention is the provision of a plastic forming apparatus including a plasticizer-extruder mechanism which is continuously operable despite the intermittent utilization of the output thereof and in which the output pressure is supplemented by an external pressure.

It is yet another object of this invention to provide a method of plasticizing plastic material under heat and pressure, introducing plasticized material under pressure into an outlet passage from which material is intermittently expressed, providing a recirculation path of flow of the material and controlling the flow of plastic material through the recirculation passage in accordance with the output of material through the extrusion outlet.

Other objects and advantages of the invention will appear from the following detailed description taken in conjunction with the annexed drawings, in which:

On the drawings:

FIGURE 1 is a schematic view of a machine of the present invention;

FIGURE 2 is a plan view of the machine;

FIGURE 3 is a longitudinal sectional view taken on the plane 3—3 of FIGURE 2;

FIGURE 4 is a sectional view, with parts shown in elevation, taken on the plane 4—4 of FIGURE 3;

FIGURE 5 is a sectional view taken on the plane 5—5 of FIGURE 4;

FIGURE 6 is a fragmentary sectional view similar to FIGURE 5 showing the machine in an operated position;

FIGURE 7 is an enlarged fragmentary sectional view taken on the plane 7—7 of FIGURE 2;

FIGURE 8 is a view similar to FIGURE 7 illustrating a portion of the machine in operated position;

FIGURE 9 is a reduced view taken along the plane 9—9 of FIGURE 7;

FIGURE 10 is a view on a reduced scale taken on the plane 10—10 of FIGURE 7;

FIGURE 11 is an end view, with parts broken away, and in section of the machine;

FIGURE 12 is an enlarged view similar to FIGURE 11 taken along the plane 12—12 of FIGURE 2;

FIGURE 13 is an enlarged sectional view taken along the plane 13—13 of FIGURE 2;

FIGURE 14 is an enlarged sectional view taken on the plane 14—14 of FIGURE 11;

FIGURE 15 is a view taken along the plane 15—15 of FIGURE 14;

FIGURE 16 is an enlarged sectional view taken on the plane 16—16 of FIGURE 2;

FIGURE 17 is a view similar to FIGURES 7 and 8 illustrating the apparatus in another adjusted position;

FIGURE 18 is a sectional view taken along the plane 18—18 of FIGURE 17;

FIGURE 19 is an electrical wiring diagram schematically illustrating the electrical control system of the machine;

FIGURE 20 is a hydraulic diagram schematically showing the hydraulic control system of the machine; and FIGURE 21 is a pneumatic diagram schematically illustrating the pneumatic control system.

General operation

FIGURE 1 of the drawings is a schematic overall view of the apparatus of the present invention and well illustrates the method of the present invention.

It will be noted that the machine includes generally a recirculating extruder-plasticizer, including a displaceable recirculation piston, a two-part sleeve valve and internal injection piston assembly, means defining an orifice through which the plasticized material is expressed, a neck mold within which a finished portion of an article, such as the neck of a container, is formed, and separable blow molds within which the article is blown to its final form.

The apparatus of the present invention and the method of this invention have been developed primarily for the utilization of plasticizable materials, preferably polyethylene or other similar thermoplastic materials.

Generally, the apparatus includes a hopper within which granular polyethylene or similar material is stored and communicating at its lower end with an elongated chamber or barrel of the extruder-plasticizer. Disposed within the plasticizer barrel is an extruder screw which rotates continuously to advance material to the discharge outlet. As the material is advanced by the extruder screw within the plasticizer barrel, the material is worked under pressure and is subjected to heat to render the material plastic and in fluid form as it issues from the free end of the extruder tube. The free end of the extruder barrel communicates with a recirculation passage which establishes communication from the discharge end of the extruder screw to a portion of the barrel displaced longitudinally from the hopper and located at a point at which the material within the extruder barrel is reduced to a viscous, fluid state. Recirculation of material through the recirculation passage is controlled by a recirculation piston which is single acting and which is fluid pressure actuated to supplement the extruder output during certain portions of the cycle and which also serve to control recirculation of the thermoplastic material.

The primary purpose of recirculation is to accommodate continuous operation of the extruder screw and to accommodate continuous plasticizing action without the necessity of halting and initiating extruder operations with each molding and blowing cycle. In effect, the recirculation passage forms a reserve or overflow accumulator into which the output of the extruder screw flows when the extruder output is not being utilized, this accumulator being vented back to the plasticizer.

The extruder and plasticizer output communicates with a restricted annular orifice through an elongated passage. Overlying this orifice and in communication therewith is a neck mold formed of separable neck mold halves. The neck or finish of the container is normally the most critical portion of the container, so far as dimensions are concerned, and in order to maintain these dimensions within the rather close tolerances required, the finish is preferably injection molded. The neck mold thus becomes an injection mold. Injection molding usually requires pressures different from those normally provided by a combination extruder and plasticizer, and this different pressure is utilized only during the injection molding step of the cycle. For such intermittent injection operations, the apparatus of the present invention utilizes an injection piston which is fluid-pressure displaceable into the conduit filled with plasticized material intermediate the plasticizer output and the orifice.

For the injection operation to be effective, the back flow of plastic to the plasticizer must be prevented and a column of plasticized material must be isolated between the injection system and the neck mold. This isolation is carried out by a sleeve valve concentric with the injection piston and insertable into the plasticized material conduit. Further, this sleeve valve is closed at all times at which plastic material is not being expressed through the orifice from the extruder-plasticizer. A novel actuating means for sequentially actuating the sleeve valve and the injection piston and also for operating the sleeve valve independently of the piston is provided by the present invention.

Following the injection of the finish within the separable neck mold, extrusion of plasticized material from the extruder-plasticizer through the orifice occurs during elevation of the neck mold, so that an extruded tubular extension is formed integral with the material filling the neck mold. The vertical movement of the neck mold is carried out in timed, correlated sequence to the extrusion of the extension, so that the extension is of differential wall thickness throughout its length to provide additional material at those portions of the finished container which need such additional material.

Following the extrusion of the tubular extension and movement of the neck mold from its position overlying the orifice, the tubular extension is enclosed within a pair of separable blow molds and blow air or other pressured fluid is introduced through the neck mold to blow the container to its final configuration.

Finally, a novel container-severing and container-pickup apparatus is actuated to remove the finished article from the machine after the opening of the blow molds.

*Recirculating plasticizer*

As best illustrated in FIGURES 2 and 3 of the drawings, the recirculating plasticizer comprises a cylinder housing or barrel 30 having an interior axial bore 31 within which is disposed a rotatable plasticizing screw 32 cooperable with the bore 31 to advance therethrough plastic material introduced into the bore from a superimposed hopper 33. The screw 32 is driven by a motor M1 by conventional means, such as a V-belt and pulley arrangement 34 (FIGURE 2). The passage 31 extending axially of the barrel 30 communicates at the free end of the screw 32 with a tapered outlet passage 35 formed interiorly of a coupling 36 joining the extruder barrel 30 with a reduced conduit 37. The tapered passage 35 also communicates with a means defining a recirculation passage including a depending tubular conduit 38 integral with the coupling 36, a horizontal conduit 39 communicating with the conduit 38 and a vertical conduit 40 communicating with horizontal conduit 39 and with the barrel bore 31 through a radial port 41 located medially of the barrel 30, i.e., intermediate the tapered outlet 35 and the hopper 33. The recirculation conduit thus accommodates communication of the plasticizer outlet passage 37 with a medial portion of the screw 32.

As illustrated schematically in FIGURE 3, the plasticizer barrel 30, the reduced outlet conduit 37 and the recirculation conduits 38, 39 and 40 are each surrounded by suitable heating means, indicated generally at 42, and suitably comprising electrical heating coils. The combination of the heating of the barrel 30 and the pressure applied to plastic material advanced therethrough by the screw 32 reduces the plastic material to a fluid plastic state for discharge at the tapered outlet 35. Actually, the cooperative action of the heated barrel and the rotatable screw is such that the plastic material is reduced to its plastic or fluid state by the time material from the hopper 33 has been advanced to the radial port 41.

Aligned with the vertical bore 43 of the conduit 38 and of substantially the same size as the conduit is a vertically displaceable recirculation piston 45 abuttable with the actuating rod 46 of a recirculation cylinder 47. This recirculation piston and cylinder combination is actuatable upwardly by virtue of fluid pressure introduced through fluid line 328, so that the piston 45 is displaced vertically into the conduit 43 under such fluid pressure.

It will be appreciated that plastic material is expressed from the screw 32 into the tapered outlet passage 35 under substantial fluid pressure, and that the venting of this passage 35 to the recirculation conduit 43 will effect the flow of thermoplastic material into the recirculation conduits 38, 39 and 40. Consequently, a recirculatory flow of plastic material will result whenever the path to the recirculation conduits 38, 39 and 40 is provided or whenever this path of flow presents less resistance to the output of the plasticizer screw 32 than the passage through the normal outlet conduit 37. Inasmuch as material carried by the screw 32 intermediate the outlet end thereof and that portion aligned with the radial port 41 is plastic, the free flow of the fluid plastic material will be accommodated whenever the piston 45 is in its retracted position. The feeding of excessive thermoplastic material to the barrel 30 will be prevented by the inherent operation of the screw 32 beneath the hopper 33 filled with granular or solid thermoplastic material which will slide above the screw and not be introduced into the barrel 30 unless additional material is required to completely fill the screw.

It will be appreciated that the piston is vertically upwardly displaced for two purposes. First, thermoplastic material within the conduit 43 will be displaced upwardly for intermingling with material within the tapered outlet passage 35 to be expressed therewith through the normal outlet conduit 37. Additionally, upward displacement of the piston 45 will cut off recirculation, inasmuch as it will interrupt communication between the conduits 38 and 39.

Obviously, in order to displace the piston 45 upwardly, the pressure exerted by the piston must be greater than the output pressure exerted by the screw 32. Once upward displacement of the cylinder 45 is completed, the line 328 is disconnected from fluid under pressure, and the communication between the orifice and the plasticizer outlet is interrupted, the output pressure of the extruder, i.e., pressure generated by the screw 32, will force the piston 45 downwardly, so as to again establish recirculation in the plasticizer.

*Injection molding structure*

As best illustrated in FIGURES 3–6, inclusive, the conduit 37 is adapted to convey plasticized material to an orifice supply passage 51 angularly related to the passage 50 (FIGURE 5), the angular transition taking place through an angle block 52 secured to the conduit 37 by suitable means, as by cap screws 53. This block 52 has a first passage 54 longitudinally aligned with the passage 50 and a second transverse passage 55 aligned with the lateral passage 51. The passage 54 is tapered and is joined to the passage 55 through an aperture 56.

The passage 51 is elongated transversely, as at 57, to receive therein a tubular sleeve valve 60 movable across the aperture 56 to be positioned intermediate the passages 50 and 55.

This valve sleeve 60 is elongated axially to include a valve body 61 having a transverse opening or aperture 62 communicating with the interior 63 of that valve through an axial passage 64.

Disposed in the valve bore 63 is a slidable injection piston 65 having an elongated stem 66 projecting through the aperture 64 into the transverse opening 62 for abutment with a sliding block 67 disposed in the opening 62 and guided for relative longitudinal movement by transversely extending pins 68. By virtue of the elongated stem 66 and the block 67, the valve 60 and the piston 65 are relatively movable to a limited extent, the degree of movement in one direction being limited by abutment of the stem 66 with the block 67 when the block is fully bottomed within the transverse opening 62. This position is illustrated in FIGURE 6 of the drawings. The other limitation on relative movement is imposed by an enlarged shoulder formed on the valve stem 66, as by a peripheral snap ring 69 engageable with the portion of the valve body surrounding the aperture 64. Also, the block 67 projects laterally beyond the valve body aperture 62 for abutment with a fixed transverse guide 70 formed as a part of the supporting framework 71 which supports the valve and sleeve actuating mechanism.

The valve body 61 is provided with a terminal enlarged head 72 at the free end thereof engageable with a corresponding fitting 73 formed at the end of the actuating rod 74 of an actuating cylinder 75. This cylinder 75 is adapted to receive fluid under pressure through conduits 324 and 315 and the actuating rod 74 thereof projects beyond the confines of the cylinder for abutment with the terminal end 76 of a valve cylinder 77.

The sequence of actuation of the cylinders is hereinafter explained in greater detail in connection with the hydraulic and electric actuating circuits of the mechanism, but briefly actuation of the cylinder 77 will displace the actuating rod 76 and the abutting actuating rod 74 to the left to insert valve sleeve 60 across the aperture 56, thereby interrupting communication between the passage 51 and 50. The valve sleeve 60 alone is actuated for this movement by virtue of the lost motion connection between the piston stem 66 and the valve body 61. Following actuation of the valve 60 and only after full actuation of the cylinder 77, the cylinder 75 is actuated to insert the piston 65 and the valve 60 jointly into the passage 51. This condition is illustrated in FIGURE 6 of the drawings.

The effect of such sequential actuation of the valve 60 and the piston 65 is initial actuation of the valve 60 to close the passage 56, such actuation requiring a relatively small actuating force because of the small annular cross-sectional area of the forward end of the sleeve and the displacement of a correspondingly small amount of plastic material during closure of the passage 56. Once the passage 56 is closed, material within the passage 51 is isolated or segregated from the material in the passage 50 and the plastic material in the plasticizer. Subsequently, further and joint actuation of the valve 60 and the piston 65 will displace a substantial amount of plastic material in the passage 51 and will subject material in the passage 51 to substantial pressures. These resultant substantial pressures are utilized as the injection pressure to injection mold the container finish, as earlier described.

To retract the valve sleeve 60 and the piston 65, fluid under pressure is simultaneously vented to both cylinders 75 and 77 through the passages 324 and 325. Because of the lost motion connection, the valve sleeve will be initially retracted followed by retractiond of the piston 65 upon abutment of the snap ring 69 with the valve body 61 at the aperture 64. Upon full retraction, the sleeve and piston parts assume their originally described positions illustrated in FIGURES 4 and 5 of the drawings.

*Orifice structure*

The transverse aperture 51 affords a passage for plasticized material into an orifice block 80 provided with opposing, longitudinally extending flanges 81 (FIGURE 7) secured by suitable means, as by screws 82, to a supporting table 83. This table 83 is apertured, as at 84, to support the orifice block 80 and is supported at either end by U-shaped vertical frame members 85 (FIGURE 11) upon which are superimposed upstanding inverted U-shaped frame members 86. These frame members 86 are provided with transverse supporting elements 87, at either end of the supporting table 83. The frame members 85 also support a transversely extending platform 86 upon which the supporting framework 71 of the cylinders 75 and 77 is carried.

The orifice block 80 is provided with a series of aligned vertically extending bores 90 in each of which is positioned an orifice sleeve 91, the sleeve having a radially outwardly projecting annular shoulder 92 seated upon a corresponding shoulder formed in the bore. Each such sleeve 91 is provided with a substantially cylindrical bore 93 receiving an elongated vertically extending mandrel 95. Underlying the block 80 and in alignment with each of the block bores 90, respectively, is an elongated adjustment block 96 fixedly secured to the orifice block 80 by suitable means, by welding or the like, and having a lower threaded aperture 97 adapted to receive an adjustment cap 98 threadedly inserted therein to maintain the mandrels in vertical position.

The mandrels 95 are each provided with a lower, radially enlarged boss 99 seated against interior shoulders 100 of the adjustment block 96. Superimposed over the sleeves 91 to lie against the upper ends thereof is an elongated orifice plate 101. This plate 101 overlies each of the sleeves 92 and is secured to the orifice block 80 by suitable means (not shown). The orifice plate 101 is provided with a series of apertures 102 and in each of these apertures is located a nozzle 103 annular in cross-section and provided with upper annular shoulders 104 underlying equivalent shoulders formed in the bores 102 of the plate 101. The sleeves 91 are recessed, as at 105, to receive the lower ends of the nozzles 103, and it will be seen that each of the nozzles 103 is securely clamped between the plate 101 and the corresponding sleeve 91. The nozzles 103 are each provided with a lower tapered bore 106 and an upper cylindrical bore 107 which cooperate with an upper tapered portion 108 of the corresponding mandrel 95 to define a generally upwardly convergent passage 110 for plasticized material. Each of these passages 110 communicates with a cylindrical passage 111 defined intermediate the cylindrical central portion of the corresponding mandrel 95 and the cylindrical bore 93 of the corresponding sleeve 91.

It will be appreciated that the mandrels 95 project freely upwardly through the cylindrical bores 93 of the sleeves 91 and through the nozzles 103 to provide the unhindered and unobstructed passages 110 and 111. Yet the mandrels are individually adjustable both axially and radially. The mandrels are positioned axially by virtue of the abutment of their enlarged lower portions 99 with the shoulders 100 under the urging of the threaded plugs 98. The mandrels are positioned radially by set screws 115 threaded into radial apertures 116 in the adjustment plate 96. Thus, threaded adjustment of the set screws 115 will shift the mandrel boss 99 laterally and will vary the position of each mandrel radially within its bore 93.

It will be noted that the sleeves 91 each project downwardly beyond the confines of the orifice block 80 and that the lower ends of the sleeves are tapered, as at 120, to terminate, as at 121, short of the embossment 99 of the associated mandrel 95. Further, it will be noted that the sleeves 91 are each provided with an exterior annular recess 122 adjacent the lower end thereof, which recess cooperates with a corresponding and registering recess 123 formed in the block 80 to provide an outer annular passage or chamber 125 communicating beneath the terminal ends 121 of the sleeves with the annular space 111 intermediate the mandrel 95 and the associated sleeve 91. The lower end of the annular passage 111 around the mandrel is constricted by an annular enlargement 126 formed on the mandrel. The passage 111 enlarges above the enlargement 126 by virtue of an annular groove 127 formed in the mandrel. The outer passage 125 communicates with the source of plastic material through a lateral passage 128 communicating with an elongated cross channel 129 which, in turn, communicates with the supply passage 51 heretofore described.

Plastic flow thus occurs from the plasticizer outlet passage 50 past the sleeve 60 and piston 65 into the supply passage 51 (FIGURE 5). From the passage 51, plastic material is distributed to the plurality of orifices by the cross channel 129. The cross channel, in turn, feeds plastic to the lateral passages 128. From the lateral passage 128 at each mandrel 95, the plastic material passes into the annular chamber 125, thence downwardly beneath the sleeve edge 121, upwardly through the passage 125, past the restriction defined by the enlarged shoulder 126 of the mandrel, through the enlarged annular passage defined by the mandrel recess 127 and finally into the annular chamber 111 and the tapered chamber 110 for issuance through the orifice. By virtue of the flow of the plastic material through the alternately enlarged and restricted passages defining this somewhat tortuous flow path, the flow of plastic material is equalized about the mandrel, there is no differential speed of plastic flow at any peripheral portion of the mandrel, and the floating mandrel is subjected only to the axial flow of plastic material and not to any side or radial thrust.

Because of the fact that the cross channel 129 feeds a plurality of orifices (five orifices in the illustrated embodiment of the invention), separate flow control means are provided for regulating the flow of plastic material into the passages 128. Specifically, a flow control valve 130 (FIGURE 7) is provided in each passage 128. Each of these valves is generally cylindrical in configuration and is slidably disposed in a vertically extending valve passage 131, preferably of the same diameter as the upper passage 128. The upper end of each valve element 130 is recessed, as at 132, so that the diameter of the valve element is presented to the fluid plastic flow to serve as a flow control means. The valve elements 130 are adjustable axially into and out of the stream of plastic flowing through the corresponding passages 128 by means of adjustment screws 133. The valves 130 will be adjusted individually for the five illustrated orifices, so that each orifice will receive the same amount of plastic material from the passage 51 regardless of the lateral position of the particular orifice along the lateral or cross flow channel 129.

To control the heating of the orifice block 80 and to prevent the excessive cooling of plastic material in the passages 128, 125, 111, and 110, the orifice block is heated by cartridge-type resistance heating elements 135 (FIGURES 9 and 10) disposed in longitudinal alignment to either side of the recesses 90.

Neck mold structure

As best illustrated in FIGURES 7, 8 and 17, each of the orifices 100 is defined by a cooperating mandrel 95 and a nozzle 103, and each such orifice is adapted for the discharge of plastic material upwardly therethrough. During the injection of the neck or finish of a container or the like, the orifice 100 has superimposed thereon a neck mold indicated generally at 150.

This neck mold is carried by the upper side frames 86 (FIGURES 11 and 14), the side frames being joined by an upper support plate 151 upon which is mounted a vertically disposed neck mold actuating cylinder 152. This neck mold cylinder 152 is surrounded by an upwardly extending frame 153 carrying a top support plate 154 on which is superimposed a stop or check cylinder 155. As will be explained in connection with the control system and operation of the device of the present invention, the stop cylinder 155 is adapted to receive fluid under pressure through line 345, the cylinder 155 being single acting and being urged downwardly by fluid pressure, so that the actuating rod 156 thereof abuts the upper extremity of the upper extension 157 of the actuating rod 158 of the cylinder 152. The cylinder 152 which controls normal movement of the neck mold 150 is double acting and is actuated by fluid pressure introduced thereinto through lines 305 and 333. The lower end 158 of the piston rod of cylinder 152 is threadedly connected, as at 159, with a neck mold guide block 160 guided by a vertical bore 161 formed in a fixed guided yoke 162 provided with oppositely laterally directed pilot portions 163 each having a vertical aperture 164 receiving a vertically disposed fixed guide rod 165. The guide rods 165 are secured in the apertures 164 and project vertically through upstanding fixed guide bosses 166 secured to the frame 86 (FIGURE 11). The guide yoke 162 is thus supported for vertical reciprocating movement from its lowered position (illustrated in FIGURE 7 of the drawings) to its raised position (illustrated in FIGURE 8 of the drawings). The guide yoke 162 is actuated between these two positions by means of the actuating cylinder 152.

The guide yoke 162 carries a plurality of depending guide pins 167 fixed to the yoke and depending into vertical apertures 168 formed in a radially enlarged embossment 169 formed at the lower end of the block 160. The block 160 is urged to its illustrated lowered position relative to the guide yoke 162 by a plurality of compression springs 170 interposed therebetween and having their ends inserted into opposing aligned recesses 171, 172.

The lower extremity of the block 160 is provided with an upwardly extending recess 175 into which is threaded a sleeve 176 which is centrally bored to receive the upper tubular end 177 of a vertically movable neck mold mandrel 178. This neck mold mandrel is provided with a central axial bore 180 through which blow air or other suitable fluid under pressure can be introduced by means of a radial air passage 355. The fluid pressure supply system is illustrated in FIGURE 21 and is hereinafter described in greater detail. The bore 180 of the neck mold mandrel 178 is radially enlarged at its upper end to accommodate a compression spring 181, and this spring 181 normally urges the neck mold mandrel downwardly to engage a radial enlargement 182 within the chamber 175 against the end of the threaded sleeve insert 176.

In addition to the axial bore 180, the neck mold mandrel 178 is provided with a plurality of vertical passages 183 parallel to the bore 180 and communicating at their upper ends with outlet housings 184, as best shown in FIGURE 7.

The spring pressed neck mold mandrel 178 is enclosed within a separable neck mold housing comprising two separable angle blocks 185 surrounding the neck mold mandrel 178 and two semi-cylindrical half-molds 186 cooperatively contoured, as at 186A, to define the bottle finish. In the illustrated embodiment, these surfaces 186A are contoured to cooperatively define exterior threads, although other neck finishes may be provided if such is desired. The neck molds 186 are mounted upon and co-movable with carriers 187, co-movement of the mold halves 186 and the carriers 187 being insured by cap screws 188. The separable carriers 187 are provided with inclined recesses 189 within which are slidably disposed similarly inclined guide pins 190 carried by the enlarged embossment 169 of the element 160. The carriers 187 are interposed between side guide projections 191 (FIGURE 9) formed on the guide yoke 162 and slots 187A receive projections and thus prevent vertical movement of the carriers 187 and the molds 186 relative to the guide yoke, but accommodates relative lateral separatory movement of the mold halves 186 and the carriers 187.

The operation of the neck mold of the present invention will be readily appreciated by comparison of FIGURES 7, 8 and 17, from which it will be seen that the neck mold is originally lowered to its position of FIGURE 7 with the neck mold mandrel 178 contacting the free upper end of the orifice mandrel 95 and with the threaded neck recess defined by the cylindrical outer surface of the neck mandrel 178 and the threaded contour of the interior of the mold halves 186 registering with the orifice 100. With the neck mold positioned in this manner, the cylinder 65 is actuated to subject the plastic material to injection pressure, and plastic material will be injected into the finish mold, confined therein, and injection molded to its finished configuration. Next, the cylinder 152 is actuated to retract the piston rod 158 upwardly, elevating the guide yoke 162, the block 160 and the neck mold 150 as a unit to the position of FIGURE 8. During this movement of the neck mold, the recirculation cylinder 47 is actuated and plastic material is extruded through the orifice 100 to form the tubular extension, as best illustrated in FIGURE 8. During this movement, the speed of withdrawal of the neck mold 186 is governed by a series of limit switches arranged vertically in sequence and supported by one of the cylindrical guide post bushings 166, as illustrated in FIGURES 11 and 14. The actuation of these limit switches is carried out by an actuating arm 195 carried by the adjacent guide projection 163. The specific operation of these limit switches is illustrated in FIGURES 19 and 20 and described in detail in connection therewith.

The extruded plastic tubular extension 200 may thus be of varying wall thickness, the wall thickness varying inversely with the speed of retraction of the piston-actuating rod 158.

When the neck mold 150 has been retracted to its position of FIGURE 17, the piston rod 157 at the upper end of the cylinder 152 abuts the piston rod 156 (FIGURE 11) of the stop cylinder 155. Upon release of the stop cylinder, by means described in connection with FIGURES 19 and 20, further retraction of the piston rod 158 is accommodated with consequent movement of the neck mold from its position of FIGURE 8 to its position of FIGURE 17. Such additional movement of the piston rod will open the neck mold because of abutment between the plate 151 and the stops 156 carried thereby and the extensions 163 of the element 160. Consequently, the guide block 162 will be held in its position of FIGURE 8, while the element 160 will be retracted against the force of the compression springs 170. This retraction will cam the mold carrier blocks 187 laterally outwardly because of the inclination of the guide pins 190, and the mold halves 186 will be separated laterally from the finish 201 previously molded by injection. As a consequence of relative movement of the guide block 162 and the element 160, the neck mold mandrel 178 is retracted from the finish 201 and the neck molds 186 are retracted laterally as above described, so that the bottle neck or finish is completely released and the bottle is no longer carried by the neck mold.

Surmounting the free upper end of the actuating rod 157 of the neck mold cylinder 152 is a T-shaped plate 190 (FIGURES 14 and 15) movable vertically with the neck mold 150. On this plate is a pivoted finger 191 engageable with the actuating arm 193 of a limit switch LS5 when the neck mold is in its position of FIGURE 8. The switch LS5 functions as hereinafter more fully described and the utilization of the pivoted finger accommodates actuation of the switch only on the upper stroke of the cylinder 152.

Also carried by the plate 190 is a second projection 192 (FIGURE 15) engageable with the actuating arm 194 of a limit switch LS6 when the neck mold is in its position of FIGURE 8. This switch LS6 is a safety interlock to prevent timer actuation of the blow mold cylinders 220 unless the neck mold is withdrawn upwardly, as hereinafter described in detail.

The plate 190 is provided with a vertical projection 196 for actuating an upper limit switch LS7 when the neck mold is in its position of FIGURE 17. This switch LS7 actuates the take-out return as hereinafter described.

*Blow mold structure*

Intermediate the operational steps illustrated in FIGURES 8 and 17 of the drawings, a pair of complementary blow mold sections are closed upon the tubular extension 200 and air is introduced through the air passage 355, the chamber 175, the axial passage 180 of the neck mandrel 178 and into the interior of the tubular extension 200. This blowing is effective to form the finished container 202 by the blowing of the tubular extension 200 against the complementary blow mold sections. The introduction of fresh air is accommodated by the escape of a portion of the blow air through the passages 183.

As illustrated in FIGURES 11, 12, 13 and 18, the blow molds are provided by complemental blow mold sections 210 provided with interior cavities 211 conforming to and cooperatively defining the exterior contour of the finished container. Further, these blow mold sections 210 are provided with inwardly extending projections 212 at their upper extremities which close upon and cooperate with the neck mold sections to form a tight fit therewith. The lower extremities of the blow mold interiors are suitably shaped to pinch the tube 200 together, as at 203, thereby forming the bottom of the container.

As best illustrated in FIGURE 18, the complemental blow mold sections 211 are each carried by a transversely extending carrier 215 having secured to either end thereof cylindrical guide projections 216 projecting through fixed tubular guides 217 carried by the vertical frame members 86. Interposed between the cylindrical guide projections 216 and the tubular guides 217 are nonfriction elements or balls 218 (FIGURE 13) capable of longitudinal rolling motion to accommodate such guiding movement with a minimum of friction.

The mold carriers 215 are actuated for transverse closing movement upon the plastic extensions 200 by means of actuating cylinders 220 having actuating rods 221 joined to the carriers 215 medially thereof. A limit switch LS4 is mounted adjacent one of the cylinders 220 to give an indication of the retracted position of the blow molds. To accommodate the utilization of different blow molds 210 and the formation of bottles of different sizes, shiftable carrier guides 217 are provided. It will be noted that these guides have forwardly projecting embossments 219 which project through enlarged openings 223 formed in the vertical support elements 86. The carriers 217 are mounted for vertical adjustment by means of bolts 221 (FIGURE 12) projecting vertically through threaded bosses 222 fixedly carried by the vertical support elements 86. It is obvious that threaded adjustment of the bolts 221 within the bosses 222 will result in vertical adjustment of the mold guide elements 217.

*Take-out mechanism*

In FIGURES 2, 16, 17, and 18, there is illustrated a novel take-out mechanism of the present invention. Generally this take-out mechanism includes a fixed carriage comprising a supporting frame and a pair of longitudinally extending guide rods 231 which are parallel to one another and which are always also parallel to the longitudinal plane of the plurality of orifices 100. Slidably disposed on these guide rods 231 is a take-out carriage including a rear bracket 232 provided with laterally extending guide sleeves 233 journalled on the rods 231 and a forward bracket 235 carrying a pair of rollers 236 rollingly engageable with the transversely spaced track elements 237 disposed to either side of the nozzle blocks.

Carried by the front bracket 235 at the leading extremity thereof is a sharpened cut-off blade 240. Also carried by the bracket 235 is a pair of laterally outwardly deflected ears 241 connected to elongated actuating rods 242 of pneumatic cylinders 243. These pneumatic cylinders 243 are double acting and receive compressed air from a source through lines 356 and 357 (FIGURE 21) to retract and extend the take-out. Joining the brackets 232 and 235 are a pair of vertically upstanding side plates 245, these side plates bearing inflatable container-contacting bags 246 formed of air-tight material, polyurethane sheeting being utilized in the preferred illustrated embodiment of the present invention. These bags are inflatable through lines 358 (FIGURE 21) after the take-out has been positioned as illustrated in FIGURE 18 to engage the sides of the blown plastic containers, as best shown in FIGURE 16. By the time the bags 246 are inflated, the containers have been severed from the orifices 100 by the cut-off knife 240, and it only remains to retract the take-out to its unloading position illustrated in FIGURE 2 to remove the containers from the machine.

The timing between the opening of the neck molds 186 and the inflation of the bottle-engaging bags 246 is such that inflation occurs simultaneously with or slightly before release of the container necks.

Carried by the bracket 232 is a projection 250 extending laterally for contacting limit switches LS3 and LS8 at the retracted and extended positions, respectively, of the take-out.

*Electric, hydraulic-pneumatic control system*

FIGURES 19, 20 and 21 of the drawings illustrate schematically the electric, hydraulic and pneumatic control circuits.

As best illustrated in FIGURE 19 of the drawings, two electric motors are preferably utilized, motor M1 driving the extruder screw and motor M2 driving a pair of hydraulic pumps P1 and P2 as best shown in FIGURE 20. These motors M1 and M2 receive three phase, sixty cycle, 220 volt electric power from lines L1, L2 and L3 and this power is converted to 110 volt current through a transformer TR to supply said current to a control system through main lines L5 and L6. The motors M1 and M2 are provided with conventional control circuits including one-way start and stop switches, the start switches being bridged by conventional holding circuits.

The control circuit incorporates two separate and distinct timers driven through timer motors TM1 and TM2. The initial phase of operation are under the control of the timer motor TM1 provided with an autocycle switch. This autocycle switch is bridged by a timer contact closed by the motor TM1, namely contact TA1, which cooperates with a contact TB6 closed by the timer motor TM2 to provide overlapping of the two timer phases upon recycling of the machine, as will be later explained.

To condition the machine for operation, it is essential that the neck mold 150 be in its down or lowered position, contacting the upper surface of the orifice block 103, so that the interior neck mold recesses 187 are aligned with the orifice 100. As best shown in FIGURE 20, the positioning of the neck mold 150 in its down position is attained by actuating the primary neck mold piston 152 downwardly within its cylinder. This operation requires energization of the solenoid S1 to actuate four-way valve V1 to the left against the bias of spring SP1 so as to interconnect the main hydraulic pressure line P1 with the upper end of the cylinder 152 for the neck mold 150. Actuation of the valve V1 to the left will effect fluid flow through fluid flow line 300, actuating to the right positioning cylinder 301 and displacing fluid flow control valve V2 to the right. In this manner, hydraulic line 302 receives fluid under line pressure from the main pressure line P1, this flow being passed through valve V2 through line 303 and check valve 304 to the upper end of the neck mold cylinder 152. Fluid displaced from the lower side of the neck mold piston by downward movement of the piston will be displaced through line 305, flow control valve 306 and lines 307 and 308 to a sump or drain line 309 through the valve V2.

Returning now to FIGURE 19, it will be seen that the solenoid S1 for depressing the neck mold 150 as heretofore described will be actuated when limit switch LS3 is actuated by retraction of the take-out 230, timer contacts TA2 have been actuated by the timer motor TM1, and limit switch LS4 responsive to full opening of the blow molds 210 has been closed.

After lowering of the neck mold 150 to its position immediately overlying the orifice, the next operation involves the injection of the container finish by the displacement of plastic material under pressure into the neck mold 150. This operation is carried out primarily by energization of solenoid S2 operative to displace four-way valve V3 to the left against the bias of compression spring SP2. As illustrated in FIGURE 19, this operation is carried out merely upon closure of primary contacts TA3 driven by the timer motor TM1.

Functionally, the energization of solenoid S2 will interconnect line 310 supplying fluid under pressure from the main pressure line P1 with line 311 by displacing valve V3 to interconnect lines 312 and 313, energizing the actuating cylinder 314 so as to displace four-way valve V4 to the right. Line 311 is connected to line 315 through a valve body 316 spring-urged, as by spring SP3, to its illustrated position interconnecting these lines. Line 315 is connected to the right-hand end of the injection cylinder 75 to displace the injection piston of plunger 65 to the left as illustrated in FIGURE 5.

Initial actuation of the injection cylinder 75 will actuate the injection piston 65 within the previously closed sleeve valve 60 to inject the plastic material under injection pressures through the passage 55 and about the mandrel 95 and through the orifice 100 into the neck mold 150, thus injection molding the finish of the container. The continued actuation of the piston 65 by fluid pressure entering the cylinder 75 through line 315 will hold the material filling the neck mold 150 under injection pressure until such time as it has sufficiently solidified to form the finish. Such pressure in the line 315 will be exerted through a back pressure by-pass line 317 to urge the valve body 316 upwardly against the pressure of spring SP3 to cut off communication between line 311 and line 315. The generation of excessive pressures will be prevented by check valve 318 subjected on one side to the pressure of line 315 and on the other side to line pressure in line 311 plus a spring urging the valve against its seat.

Following the injection of the finish, the timer motor T1 opens the timer contact TA3, thus effectively de-energizing the solenoid S2 and allowing the valve body V3 to return to its illustrated right hand position under the bias of the spring SP2. This movement of the valve V3 vents the pressure in the line 311, since an actuating cylinder 320 moves the valve V4 to its illustrated right-hand position to interconnect the line 315 with a drain line D2, the valve 316 having been returned to its illustrated position by the pressure in line 315 overcoming the spring pressure on valve 318 once line 311 is vented to drain D2. Thus, there is no longer pressure within the injection cylinder 75 urging the injection piston 65 to its left-hand or injecting position.

Simultaneously with the opening of the timer contact TA3 and the de-energization of the solenoid S2, timer contact TA4 is closed which, so long as limit switch LS9 is closed by the presence of the neck mold 150 in its down position, energizes the solenoid S3. This solenoid S3 is effective to retract both the injection piston 65 and the sleeve valve 60 and to actuate the recirculation piston 46 to supplement the plasticizer-extruder output, as hereinbefore described. More specifically, the solenoid S3 actuates a valve V5 to the left against the bias of the spring SP4 so as to interconnect the fluid pressure in the line 310, via branch line 321, with an actuating cylinder 322, displacing this cylinder to the right and simultaneously displacing the valve V6 in the same direction.

The valve V6, when in its right hand position, interconnects pressure line 321 and a second pressure line 323 which is connected by conduits 324 and 325 to the retraction lines 324 of the injection cylinder 75 and 325 of the valve cylinder 77, thus retracting both the injection piston 65 and the injection sleeve 60. Movement of the injection piston 65 to the right is accommodated as heretofore explained upon de-energization of the solenoid S2. Further, the line 323 is interconnected with the recirculation cylinder 47 through a line 326 leading through a cut-off valve 327 and a line 328 to the under side of the recirculation cylinder 47. The valve 327 is urged to its lower position by means of a spring SP5 so as to normally interconnect the lines 326 and 328. The valve 327 is provided with a relief or check valve 329 and a by-pass line 329A operable as earlier explained in connection with valve 316. The upper displacement of the recirculation piston 46 will supplement the output of the plasticizer screw 32 to displace plasticizer material through the orifice 100 as heretofore explained.

To accommodate the flow of material from the extruder screw and the recirculation piston 47, the sleeve valve 60 of the injection piston 65 has been withdrawn as previously explained and the neck mold 152 must be displaced upwardly.

To accommodate upward movement of the neck mold, as the extrusion of the tubular extension proceeds, the timer switch TA2 is de-energized, de-energizing the solenoid S1 and allowing the valve V1 to return to its illustrated right-hand position of FIGURE 20. At this time, the spring SP1 returns the valve V1 to its right-hand position interconnecting the actuating cylinder 301 with a drain conduit D3 and connecting a second actuating cylinder 330 with the pressure conduit 302. Displacement of the valve V2 to the left results in the connection of the line 308 with the hydraulic fluid under pressure in the line 302. Pressure within the line 308 opens the check valve 331 against the bias of its spring, thus by-passing the valve 306 and simultaneously exerting pressure on the under side of the neck mold lift cylinder 152 and on the valve 306 through by-pass 332 to elevate the valve 306 so as to accommodate the interconnection of the pressure line 308 and the line 305. Thus, fluid pressure exists on the under side of the neck mold piston 158 urging the piston upwardly, which pressure flows through valve 306 more easily than through check valve 331. Once pressure exists on both sides of the valve 331, the check spring closes the valve.

Upward movement of the piston is resisted by back pressure generated thereabove in the cylinder 152, this back pressure being generated by the flow of fluid through line 333 and a restricted orifice 303 vented to a drain D4 through valve V2 and line 309 previously described.

Thus, the neck mold 150 will be displaced upwardly slowly during its initial movement due to the resistance to back pressure flow through the restricted orifice 334. This slow initial movement of the neck mold 150 is desirable to (1) provide a thicker wall section in that portion of the tubular extension 200 corresponding to the shoulders of the finished container and to (2) avoid the rupture of the material issuing from the orifice 100 under the combined pressures exerted by the extruder screw 52 and the recirculation piston 46 from the material previously injection molded in the neck mold 150.

As the neck mold 150 moves upwardly, the plate 195 attached thereto contacts limit switch LS10, closing this limit switch and energizing solenoid S4. This solenoid S4 is effective to displace to the left valve V8 against the bias of spring SP6. Leftward movement of the valve V8 will interconnect pressure line 336 and an actuating cylinder 337 displacing the valve V7 to the right. Displacement of the valve V7 to the right will interconnect line 303 and the drain D4 with a line 338 so as to accommodate flow through a second and larger orifice 339. The interposing of the larger orifice 339 into the drain line of the neck mold cylinder 152 will offer less resistance to displacement of the neck mold cylinder upwardly and will result in upward travel of the neck mold 150 at an increased rate of speed. Thus, the wall thickness of the tubular extension will be lessened.

As the neck mold 150 continues to move upwardly, the projecting plate 195 on the neck mold actuating rod 158 closes limit switch LS5, and this limit switch will initiate operation of the second timer by starting timer motor TM2.

It will be noted that the solenoid S4 controlling actuation of the neck mold piston 158 by venting the back pressure effective thereon to drain is energized by the limit switch LS10 and not by a contact of the first timer TM1. Therefore, the neck mold 150 continues to travel upwardly.

However, it will be noted that the solenoid S3 which, in effect, holds the valve V6 in its right hand position so as to retract the injection piston 65 and the sleeve valves 60 is operated as a consequence of operation of the timer TM1, since opening of the contact TA4 will de-energize the solenoid S3. Consequently, the spring SP4 will shift the valve V5 to the right, energizing actuating cylinder 340 to similarly shift valve V6 to the right to its illustrated position of FIGURE 20, thereby connecting the sleeve valve cylinder 77 with the fluid pressure in line 321 through line 341. Thus, the sleeve valve 60 moves across the orifice interrupting communication between the extruder screw 32 and the orifice 100 and cutting off the pressure flow of plasticized material through the orifice 100. Simultaneously, the recirculation piston 46 is cut off from fluid pressure by the movement of valve V6 to its illustrated position and is connected to the drain.

The neck mold 150 continues to move upwardly, stretching slightly the previously extruded plastic material tubular extension 200 and such stretching continues until the upper stop extension 157 of the neck mold piston contacts the stop rod 156 of the stop cylinder 155. The stretching of the tubular extension 200 results in the formation of a uniform, truly vertical tube which is aligned with the vertical axis of the mold and which can be blown to a uniform container. The stretching does not change any differential wall thickness in the tube, since substantially uniform longitudinal thinning of all wall thicknesses results. This stop rod 156 is extended downwardly inasmuch as pressure in the main line P1 is passed by valve V9 through line 345 to the upper end of the cylinder, as shown in FIGURE 20. Because of the pressure drop across the restricted orifice 339, the pressure acting in the under side of the neck mold piston is less than the pressure acting upon the upper side of the stop cylinder, and the cylinder neck mold piston will no longer be displaced upwardly despite the fact that there is full line pressure on the under side thereof.

As soon as the neck mold clears the upper extent or extremity of the blow molds, limit switch LS6 is actuated. It will be noted that limit switch LS6 closes a circuit to energize solenoid S5 inasmuch as the timer contacts TB2 have been previously closed by the timer motor TM2. This solenoid S5 displaces a valve V10 to the left against the bias of spring SP7 to connect line 346 from pressure line 310 with an actuating cylinder 347 effective to actuate valve V11 to the right so as to interconnect the outer extremity of the mold cylinder with fluid under pressure. Consequently, the blow mold pistons are displaced inwardly to enclose the tubular formation extruded through the orifice during upward displacement on the neck mold.

This solenoid S5 remains actuated while a solenoid S6 is energized by timer contact TB3 to introduce expanding air through the hollow neck mold mandrel to expand the tubular extrusion against the inner wall surfaces of the blow molds. More specifically, the solenoid S6 actuates valve V15 against spring SP10 to introduce the blow air, as shown in FIGURE 21. The blowing operation is a timed operation and the opening of the contact TB3 will shut off the expanding air by de-energizing solenoid S6.

The blow air introduced through the neck mold 180 is under substantial pressure, i.e., on the order of 100 pounds per sq. in., and substantially instantaneous inflation of the tube 200 will occur. To promote cooling of the tube, circulation of this blow air is accommodated through passages 183 and valve housings 184. To prevent substantial loss of blowing pressure, there are provided spring-urged check valves 360 (FIGURE 21) openable only after the blow pressure becomes substantial, i.e., on the order of 75 pounds per sq. in. The venting of blow air is accomplished, but the small cross-sectional area of the outlet passages 183 in comparison to the area of the inlet bore 180 and the provision of the check valves 360 prevents the loss of appreciable air pressure within the blow molds. The resultant circulation of air and the continuous supply of relatively cool air to replace the vented heated air results in a decided coolant effect and substantially reduces the time required for setting of the heated plastic material to its final form.

Subsequently and after the elapse of sufficient time to accommodate setting of the heated material the opening of the timer contacts TB2 will de-energize the solenoid S5, allowing the spring SP7 to displace the valve V10 to the right, connecting the actuating cylinder 347 with a drain D5 and the opposing actuating cylinder 348 with the line 346 to displace the valve V11 to the left, to its illustrated position in FIGURE 20. In this position, the valve V11 connects the inner ends of the blow mold cylinder, through line 349, with pressure line 346 to open the blow molds. Opening of the blow molds actuates limit switch LS4 to its closed position. The limit switch LS7 was previously closed when the neck ring was moved to its uppermost position. Upon closure of the timer contact TB5, solenoid S7 is energized, valve V16 is shifted to the right spring SP11, and the take-out cylinder is actuated to move the take-out inwardly beneath the blown containers which are exposed when the molds open. Of course, movement of the take-out inwardly severs the molded and blown containers from the orifice by means of cutter blades 240.

When the take-out is in its furthest position, limit switch LS8 is actuated to energize relay CR2 and the energization of this relay will energize solenoids S8 and S9 and S10. Solenoid S8 actuates a valve V17 against the bias of spring SP12 to introduce inflating air into the resilient bags of the take-out thereby clamping the finished containers in the take-out. At the same time, solenoid S9 is energized to actuate valve V12 to the left against the bias of a spring SP8 moving actuating cylinder 350 to the right and similarly moving valve V9. Valve V9 in its actuated right hand position interconnects the line 345 and a drain D6, thus removing the hold-down pressure on the neck mold hold-down cylinder. This frees the neck mold for further upward movement under the pressure in line 305.

To facilitate the rapid upward movement of the neck mold, solenoid S10 is energized to displace valve V13 to the left against the bias of spring SP9, so that actuating cylinder 351 can displace valve V14 to the right interconnecting the back pressure line 333 with a drain D7. The valve V14 accommodates substantially full flow from the line 333 to the drain D7, thereby accommodating the relatively rapid upward movement of the neck mold and releasing the container finish from the neck mold.

The opening of the molds to open LS4 de-energizes the solenoid S7 to thereby retract the take-out. It will be noted that the energization of the relay CR2 to energize the solenoid S8 also energizes relay CR3, and energization of the relay CR3 will introduce a timed operation, under timer contacts TB7 for maintaining the solenoid S8 energized to maintain clamping pressure upon the containers in the take-out after the take-out has returned to its normal position. When the timed operation of the relay CR3 expires, the containers are released from the take-out and are removed by gravity or any other suitable way from the apparatus.

Additionally it will be seen that actuation of the relay CR3, through its points establishes a circuit through timer contacts TB7 and TA5, thus bridging the gap between timers TM1 and TM2 and re-establishing timer TM1 as the controlling timer, so that the next cycle may commence by energization of the solenoid S1 and movement of the neck mold downwardly as heretofore described.

We claim:

1. In a process of making a plastic article by an injection molding, extrusion and blowing cycle wherein fluid plasticized material supplied by a plasticizer-extruder is segregated from an orifice during the injection molding and blowing portions of the cycle and communication between the plasticizer-extruder and the orifice is established during the extrusion portion of the cycle to express a tubular extrusion through the orifice, the steps of recirculating through a conduit exterior to said plasticizer-extruder plasticized material supplied under pressure by the plasticizer-extruder during segregation, thereby accommodating continuous operation of the plasticizer-extruder, simultaneously terminating segregation and interrupting recirculation, and thereafter concurrently supplying plasticized material from the plasticizer-extruder and the conduit during the extrusion portion of the cycle.

2. In a plastic forming apparatus having a plasticizer-extruder including an elongated tubular plasticizing chamber and heat and pressure means operable to plasticize material movable in one direction through the chamber toward an output orifice, the improvements of a valve interposed between the chamber and the orifice to control communication therebetween, a recirculation conduit disposed exteriorly of the chamber and having an inlet intermediate the chamber and the valve, said conduit conveying plasticized material under pressure from the output end of the chamber to a medial portion thereof when said valve interrupts the chamber-orifice communication, reciprocal piston means disposed interiorly of said conduit, said piston being movable in one direction to accommodate the recirculation of plasticized material through the conduit when said valve interrupts chamber-orifice communication and being movable in the opposite direction to prevent recirculation and to express material from the conduit to supplement material supplied by the plasticizer-extruder when the valve accommodates chamber-orifice communication, said piston being movable in said one direction by the pressure of plasticized material, and single acting power means for moving said piston in said opposite direction.

3. In a plastic forming machine having an injection mold registrable with an extrusion orifice, a plasticizer-extruder for supplying plasticized material under pressure to the orifice through a supply conduit, and power means for retracting the neck mold from registration with the orifice to accommodate the extrusion of a tubular extension integral with the material filling the injection mold, the improvements of valve means controlling material flow through the supply conduit, said valve means when closed segregating material in the supply conduit from said plasticizer-extruder and when open accommodating extrusion of said extension, an injection piston insertable into said conduit only when said valve means is closed to subject the segregated material to an injection molding pressure different from the plasticizer-extruder pressure, first power means for inserting said injection piston, a second piston movable in a chamber operatively interposed between said plasticizer-extruder and said valve and receiving material from the plasticizer-extruder when the valve means is closed, second power means for actuating said second piston to displace material from said chamber when the valve means is open, and control means for said first and second power means and said valve means including means responsive to registration of said injection mold with said orifice to accommodate insertion of said first piston, timer means for maintaining said first piston inserted during at least partial setting of said plasticized material in said injection mold, and simultaneously actuated means responsive to said timer means for withdrawing said first piston, opening said valve means, and actuating said second piston prior to retraction of the neck mold from registry with the orifice.

4. In a plastic forming machine having an injection mold registrable with an extrusion orifice, a plasticizer for supplying plasticized material under pressure to the orifice through a supply conduit, and power means for retracting the neck mold from registry with the orifice to accommodate the extrusion of a tubular extension integral with material filling the injection mold, the improvement of actuatable valve means interposed in the supply conduit, said valve means being actuatable selectively to segregate the orifice and material in the conduit intermediate the valve means and the orifice from said plasticizer and to establish plasticizer-orifice communication, means defining a recirculation passage through which material issuing from the plasticizer is recirculated to a medial portion of the plasticizer when the valve means is actuated to segregate the orifice from the plasticizer, a power-actuated injection piston insertable into said conduit intermediate the valve means and the orifice to subject the segregated material to injection molding pressures independent of said plasticizer pressure and retractable from said conduit upon actuation of said valve means to establish orifice-plasticizer communication, and a power-actuated extrusion piston in said recirculation passage, said recirculation piston being operably interposed between said plasticizer and said valve means and operable when the valve means is actuated and the injection piston withdrawn to displace material from the recirculation passage into the conduit to supplement the material output from the plasticizer to the orifice.

5. In a plastic-forming machine, an injection mold movable into and out of registration with an extrusion orifice, a plasticizer-extruder housing having a screw therein for supplying plasticized material under pressure to the orifice through a supply conduit, power means for retracting the neck mold from registry with the orifice to accommodate the extrusion of a tubular extension integral with the material filling the injection mold, a valve in said supply conduit intermediate the plasticizer-extruder and the orifice; said valve being movable to a first position for interrupting the flow of plasticized material from said screw to said orifice and movable to a second position to accommodate extrusion of said extension, a recirculation conduit connecting a medial portion of the plasticizer housing to the supply conduit intermediate the screw and the valve, a recirculation piston reciprocable in said conduit from a first position accommodating recirculation to a second position at which recirculation is interrupted, first power means for displacing said recirculation piston from said first position to said second position, an injection piston movable in one direction for subjecting plasticized material trapped between the valve and the orifice to injection molding pressure and movable in a second direction to accommodate screw-orifice communication, second power means for sequentially actuating said valve means and said injection piston to interrupt communication and to subject the material to injection pressure respectively, control means for said second power means to actuate the second power means upon registration of said injection mold with said orifice, and additional control means for both said first and said second power means to move said valve to its second position and to move said injection piston to its second position, and to displace said recirculation piston from its first position to its second position.

References Cited in the file of this patent
UNITED STATES PATENTS

| | | |
|---|---|---|
| 1,872,327 | Patten | Aug. 16, 1932 |
| 2,253,155 | Wadman et al. | Aug. 19, 1941 |
| 2,485,523 | Ashbaugh | Oct. 18, 1949 |
| 2,710,987 | Sherman | June 21, 1955 |
| 2,804,654 | Sherman | Sept. 3, 1957 |
| 2,871,516 | Sherman et al. | Feb. 3, 1959 |
| 2,881,477 | Triulzi | Apr. 14, 1959 |
| 2,887,716 | Crosio | May 26, 1959 |
| 2,890,491 | Hendry | June 16, 1959 |

FOREIGN PATENTS

| | | |
|---|---|---|
| 163,661 | Australia | June 28, 1955 |
| 1,170,301 | France | Sept. 28, 1958 |